United States Patent
White et al.

(10) Patent No.: US 6,785,653 B1
(45) Date of Patent: Aug. 31, 2004

(54) DISTRIBUTED VOICE WEB ARCHITECTURE AND ASSOCIATED COMPONENTS AND METHODS

(75) Inventors: James E. White, San Carlos, CA (US); Matthew Lennig, Palo Alto, CA (US)

(73) Assignee: Nuance Communications, Menlo Park, CA (US)

(*) Notice: Subject to any disclaimer, the term of this patent is extended or adjusted under 35 U.S.C. 154(b) by 0 days.

(21) Appl. No.: 09/561,680

(22) Filed: May 1, 2000

(51) Int. Cl.$^7$ .......................... G10L 21/00; G10L 15/00
(52) U.S. Cl. ................. 704/270.1; 704/270; 704/275
(58) Field of Search ............................... 704/270.1, 275, 704/270

(56) References Cited

U.S. PATENT DOCUMENTS

| | | | |
|---|---|---|---|
| 5,915,001 A | * 6/1999 | Uppaluru ................. | 704/88.22 |
| 5,953,700 A | * 9/1999 | Kanevsky et al. ........ | 704/270.1 |
| 5,956,683 A | * 9/1999 | Jacobs et al. ............ | 704/270.1 |
| 5,960,399 A | * 9/1999 | Barclay et al. .......... | 704/270.1 |
| 6,363,348 B1 | * 3/2002 | Besling et al. .......... | 704/270.1 |
| 6,366,886 B1 | * 4/2002 | Dragosh et al. ......... | 704/270.1 |
| 6,434,526 B1 | * 8/2002 | Cilurzo et al. .......... | 704/270.1 |
| 6,456,974 B1 | * 9/2002 | Baker et al. ............. | 704/270.1 |
| 6,556,563 B1 | * 4/2003 | Yarlagadda ................. | 370/352 |
| 6,560,576 B1 | * 5/2003 | Cohen et al. ................ | 704/270 |

OTHER PUBLICATIONS

"Nuance Speech Recognition System Developer's Manual, Version 6.2", Nuance Communications, Menlo Park, California, 1999, pp 3–14.

"Discontinuous Transmission," Sep. 6, 2002, pp. 1–3, Whatis.com Target Search, http://whatis.techtarget.com/definition/0,,sid9_gci761635,00.html.

$3^{rd}$ Generation Partnership Project: Technical Specification Group Services and System Aspects Architectural Aspects of Speech Enabled Services; (Release 6), 3GPP TR 23.877 V1.0.0 (Dec. 2003) Technical Report, 2002, pp. 1–14, 3GPP Organizational Partners, Valbonne, France.

Drenthl, Erwin, et al., "Using GSM ERF Parameters for Speech Recognition," pp. 1–8, KPN Royal Dutch Telecom, The Netherlands, downloaded from http://lands.let.kun.nl/literature/ICASSP–KPN.ps. on Dec. 30, 2003.

Besacier, L., et al., "GSM Speech Coding and Speaker Recognition," pp. 1–4, Neuchatel, Switzerland, Feb. 2000.

* cited by examiner

*Primary Examiner*—Susan McFadden
(74) *Attorney, Agent, or Firm*—Blakely, Sokoloff, Taylor & Zafman LLP

(57) ABSTRACT

A speech-enabled distributed processing system forming a Voice Web includes a gateway, one or more voice content sites coupled to the gateway over a wide area network, and a browser coupled to the gateway over a network, which may or may not be the wide area network. The gateway receives telephone calls from one or more users over telephony connections and performs endpointing of speech of each user. The browser provides the gateway with information enabling the gateway to selectively direct the endpointed speech to a voice content site via the wide area network. The gateway outputs the endpointed speech in the form of application protocol requests onto the wide area network to the appropriate site, as specified by the browser, or to the browser. The gateway receives prompts in the form of application protocol responses from the browser or a voice content site and plays the prompts to the appropriate user over the telephony connection. While accessing a selected voice content site, the gateway reroutes the endpointed speech to the browser if the endpointing result represents a hotword candidate.

54 Claims, 21 Drawing Sheets

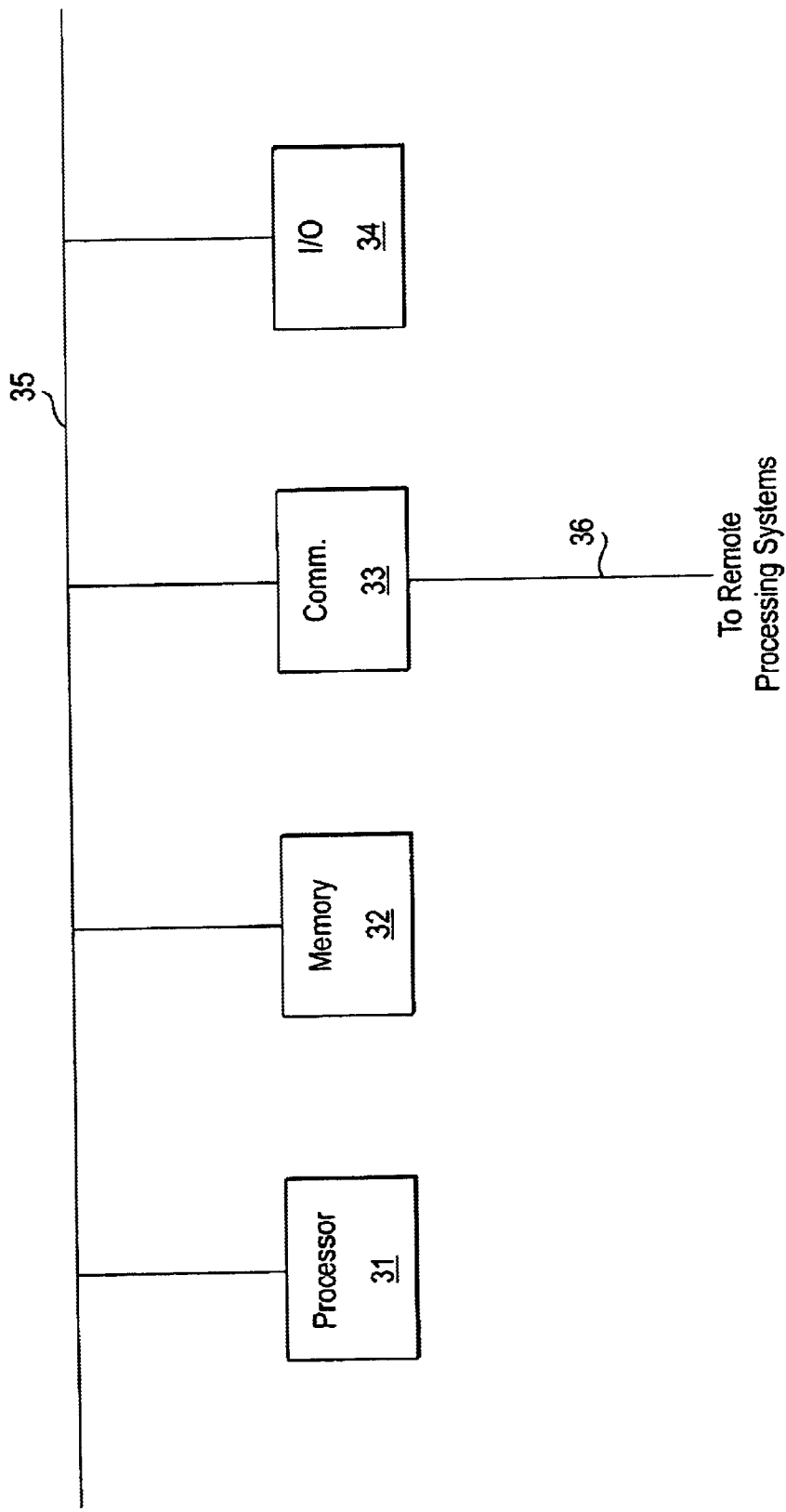

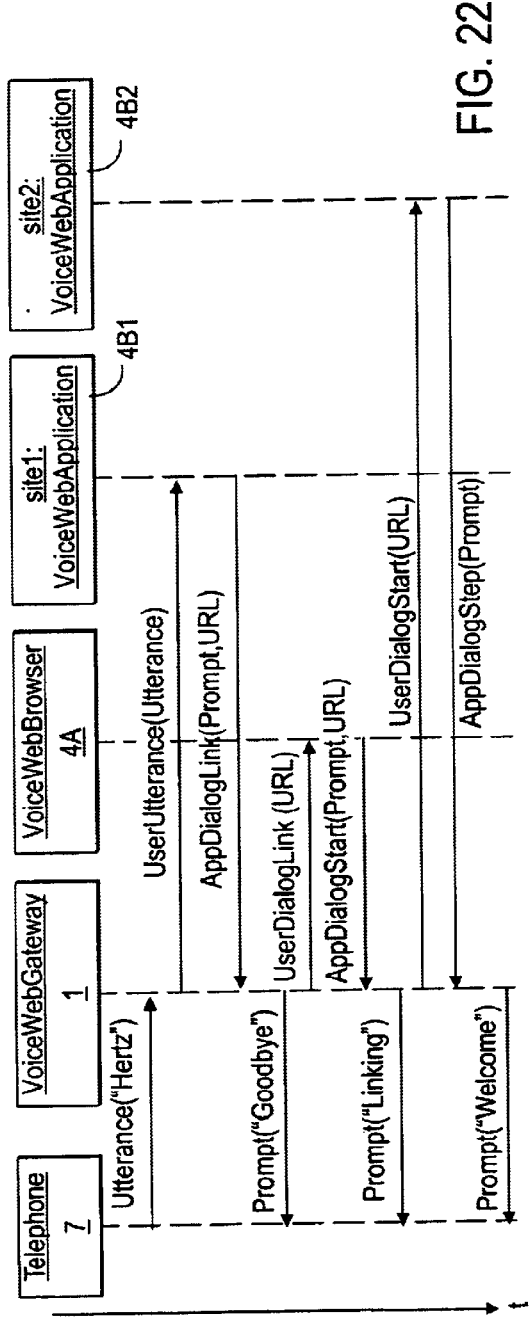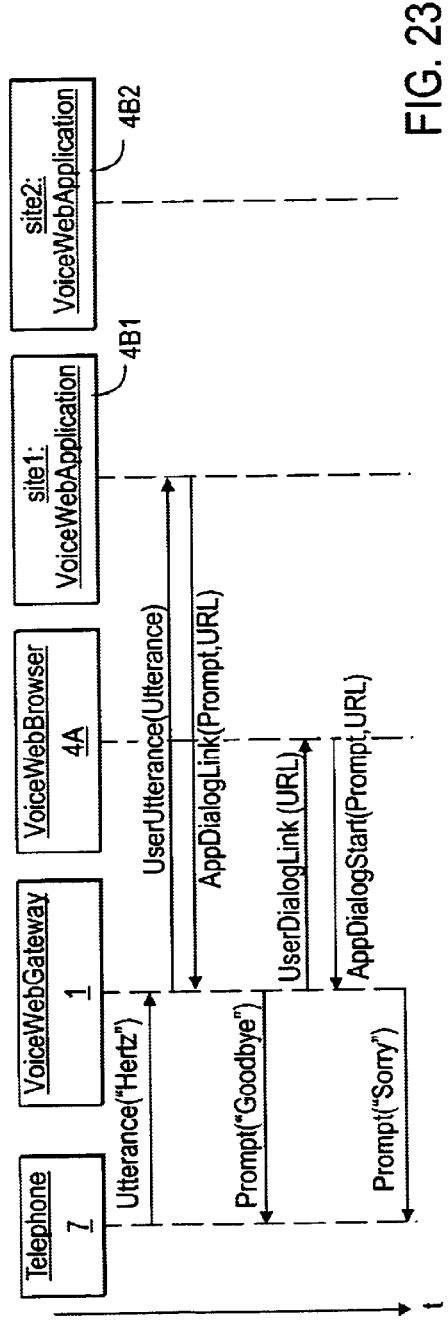

DISTRIBUTED VOICE WEB ARCHITECTURE AND ASSOCIATED COMPONENTS AND METHODS

FIELD OF THE INVENTION

The present invention pertains to a distributed voice web architecture. More particularly, the present invention relates to a method and apparatus for providing one or more users with voice access to various voice content sites on a network.

BACKGROUND OF THE INVENTION

The World Wide Web ("the Web") is a global, Internet-based, hypermedia resource used by millions of people every day for many purposes, such as entertainment, research, shopping, banking, and travel reservations, to name just a few. The hyperlink functionality of the Web allows people to quickly and easily move between related pieces of information, without regard to the fact that these pieces of information may be located on separate computer systems, which may be physically distant from each other. Rapid advances have been made in Internet technology and Web-related technology in particular, to make the Web an increasingly valuable resource.

Another rapidly advancing technology is speech technology, which includes automatic speech recognition. Automatic speech recognition facilitates interactions between humans and machines. Like the Web, therefore, speech technology can be used for, among other things, facilitating people's access to information and services. A few speech-based services exist today. However, these services are generally implemented separately from each other, typically on a small scale, and using different proprietary technologies, many of which are incompatible with each other.

SUMMARY OF THE INVENTION

The present invention includes a method and apparatus in which speech of a user is received and endpointed locally. The endpointed speech of the user is transmitted to a remote site via a wide area network for speech recognition. Remotely generated prompts that have been transmitted over the wide area network are received and played to the user.

Another aspect of the present invention is a method and apparatus in which endpointed speech of a user that has been transmitted remotely over a wide area network by a remote device is received. The speech is recognized locally, and a prompt is generated in response to the speech. The prompt is then transmitted to the remote device over the wide area network.

Another aspect of the present invention is a speech-enabled distributed processing system. The processing system includes a gateway and a remote voice content site. The gateway is coupled to receive speech from a user via a voice interface and performs endpointing of the speech. The gateway transmits the endpointed speech to the remote voice content site over a network, receives prompts from the remote voice content site via the network, and plays the prompts to the user. The voice content site receives results of the endpointing via the network and performs speech recognition on the results. The voice content site also generates prompts and provides the prompts to the gateway via the first network, to be played to the user. The voice content site also provides control messages to the gateway to cause the gateway to access any of multiple remote voice content sites on the network in response to a spoken selection by the user. The voice content site may include a speech application, such as a voice browser, which generates the prompts and the control messages.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 3 is a block diagram of a processing system which may be used to implement one or more of the components in FIGS. 1 and 2;

FIGS. 14 through 25 are timing diagrams showing the communication between Voice Web components for various different incoming call scenarios.

DETAILED DESCRIPTION

Figure 1:
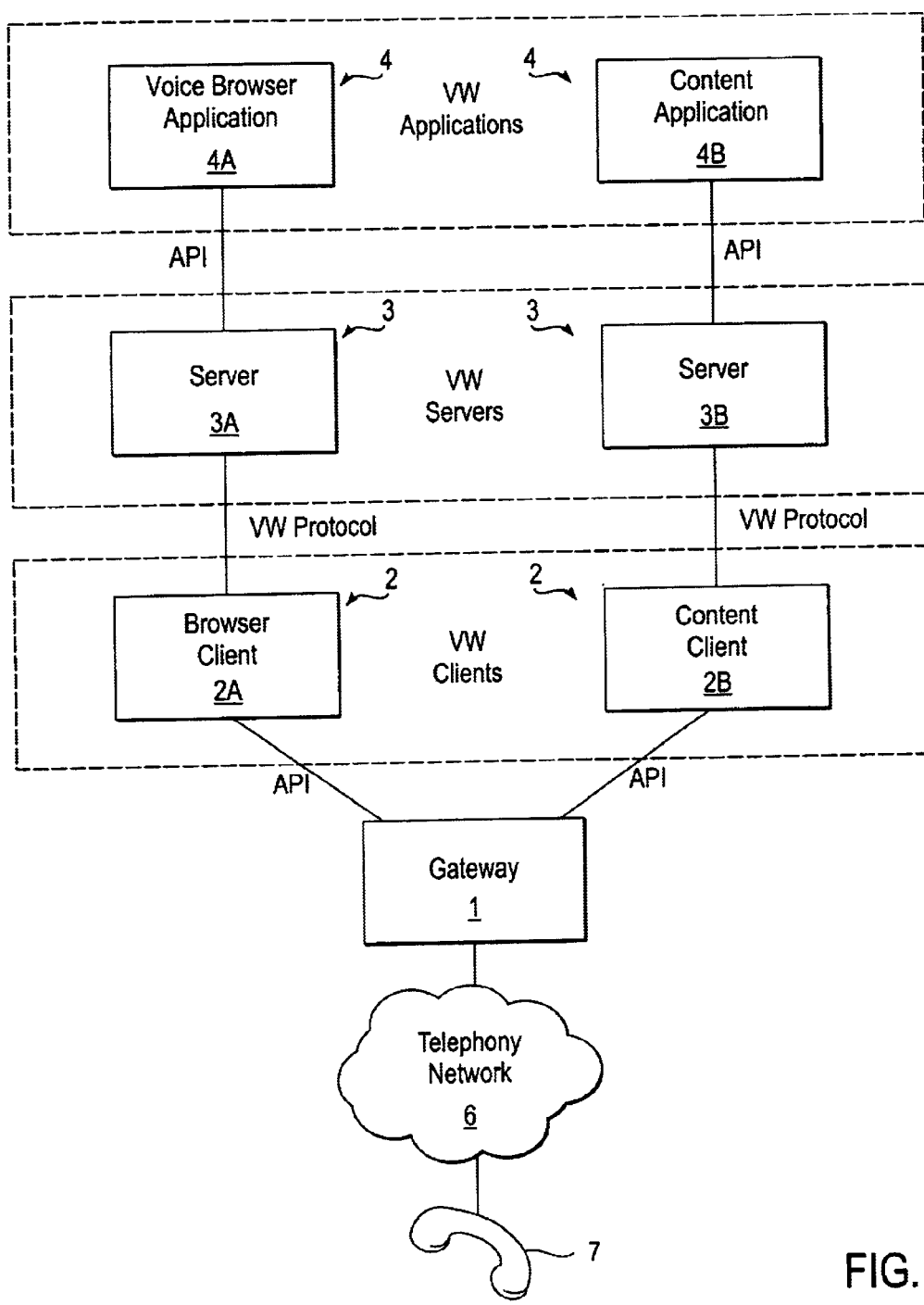
FIG. 1 illustrates an architecture for a Voice Web.

A distributed voice web architecture that provides a user with access to any of multiple voice content sites (VCSs) on a distributed network is described. Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

It is desirable to have a voice-based analogue to the World Wide Web, i.e., a "Voice Web" characterized by a large-scale network of hyperlinked, voice-enabled content sites. A Voice Web such as this does not yet exist. Sites on the Voice Web preferably would implement automatic speech recognition, so that a person can access content on the sites using speech. For example, a user might speak and listen to content on a Voice Web site using a conventional telephone. Recorded or synthesized speech might be used to play audible prompts to the user. A user might access voice-enabled content on the Voice Web using a voice-responsive browser, which is a software application that allows the user to find, examine, and modify information on the Voice Web. Voice-enabled content (or "voice content") on the Voice Web might be organized into discrete, separately-identifiable "dialog units" provided by various Voice Content Sites (VCSs). These dialog units would be analogous to conventional hypertext Web pages and may therefore be referred to as "voice pages". The user might access these voice pages using the voice browser with standard hyperlink navigation techniques (e.g., using bookmarks or favorites, a "go forward" command, a "go back" command). The hyperlinks that connect the voice pages may be implemented using any of a variety of techniques, such as: "voice hyperlinks" (words or phrases that a user must speak to access particular voice pages), "earcons" (sounds than an application generates to delimit voice hyperlinks), or Dual-Tone Multiple Frequency (DTMF) tones.

As noted, a Voice Web such as this does not yet exist. Current speech-based services are generally implemented separately, typically on a small scale, and using different, sometimes incompatible proprietary technologies. This is at least partially due to the fact that no standardized architecture or technology has been introduced to date, to implement a large-scale Voice Web inexpensively, in a manner that provides scalability, simplicity of implementation, and ease-of-use comparable to that of the World Wide Web. Further, these existing speech services each tend to provide their own service-specific "browser", which does not provide multiple-service functionality. Moreover, existing speech services generally rely on telephone access.

I. Overview

The Voice Web and associated components and techniques described herein overcome the above-noted problems. As described in greater detail below, a speech-enabled distributed processing system may include a Voice Web "gateway", one or more VCSs, each maintaining a speech-enabled application and coupled to the gateway over a wide area network (WAN), and a browser VCS maintaining a voice browser (application) and coupled to the gateway via a WAN, a Local Area Network (LAN), or any other type of network. The gateway receives telephone calls from one or more users over a telephony connection and performs endpointing of speech of each user. The endpointed speech is transmitted by the gateway over the WAN or other network to the appropriate voice application.

As used herein, the term "WAN" refers to any network or internetwork (an aggregation of multiple networks) that is distributed over a relatively large geographic area. A WAN is typically characterized by greater latency and/or poorer (and non-guaranteed) Quality of Service (QoS) than a LAN, for example. Examples of WANs include the Internet as well as multiple-campus corporate and academic networks.

The gateway provides hyperlinking capability to allow a user to access sequentially multiple VCSs on the network, using voice hyperlinks and/or DTMF tone based hyperlinks, for example. The gateway can follow a hyperlink directly or indirectly. That is, the gateway can access a selected content application using hyperlink control information received from a first content application, or it can send the hyperlink control information to the browser. The browser can direct the gateway to follow a hyperlink or respond to a user navigation command, such as "go forward" or "go back".

The gateway directs the endpointed speech of the user to a selected application over the network. The gateway outputs the endpointed speech in the form of requests onto the WAN to the selected VCS. While accessing a selected VCS, the gateway also sends the endpointed speech to the browser if the result of endpointing indicates the speech may be a browser "hotword" (a word or phrase which, when spoken by the user and recognized, provides the user with access to the browser). Thus, separate sets of endpointing parameters may be used, one for purposes of hotword identification and the other for general speech recognition. The gateway receives prompts in the form of responses from the browser or the selected VCS and plays the prompts to the appropriate user over the telephony connection.

An advantage of separating the endpointing and recognition functions by a network in this manner, is that the gateway can include minimal functionality, i.e., only telephony, endpointing, voice-linking, and certain hotword functionality. Thus, the gateway can be manufactured as a relatively small and/or inexpensive device. Further, VCS providers do not need to provide these functions in a VCS, allowing VCSs to be simpler, less expensive, and easier to operate and maintain. Numerous other advantages are also provided by this architecture, as described in detail below (see section "IX. Advantages of the Distributed Voice Web Architecture").

FIG. 1 illustrates the components of a Voice Web and the relationships between them. The Voice Web may be constructed of both hardware and software components that behave as described herein. Hence, as will be readily apparent to those skilled in the art, each of the components illustrated in FIG. 1 may be implemented in hardware, software, or a combination of hardware and software. For those aspects that are implemented in software, if any, any suitable programming language or languages may be used, such as C, C++, or Java. Also, note that FIG. 1 shows the logical relationships between components, but does not imply a particular physical arrangement of components. Thus, certain components shown in FIG. 1 may, in practice, be included within one or more other components shown in FIG. 1, as will be apparent from the description which follows.

Division of responsibility among the illustrated components allows these components to be distributed widely among network hosts. Such distribution has many advantages, several of which are discussed below. The Voice Web may include many components, which can be grouped into just a few classes. Referring to FIG. 1, the following classes of component are defined: a gateway 1, a client 2, a server 3, and a speech-enabled application 4 (also referred to as a "speech application" or a "voice application"). There are two types of client 2 in this architecture: a browser client 2A and a content client 2B. There are also two types of application 4: a voice browser application 4A (also referred to as a "browser application") and a content application 4B (also referred to as a "speech content application", "content application", or the like). Hence, server 3A in FIG. 1 is a server 3 that is associated with a browser 4A, while server 3B is a server 3 that is associated with a content-oriented application 4B. These two types of server 3 may be identical. Note that in practice, a Voice Web can, and preferably will, include many of each type of component shown in FIG. 1. Nonetheless, certain components in FIG. 1 can also support multiple users and/or multiple other components, as described further below.

A gateway 1 provides a bridge between a telephony-enabled network 6 and a WAN (not shown), such as the Internet, through which a server 3 is accessed. The WAN may be, for example, the Internet (on which the conventional World Wide Web is implemented), although it can be or include essentially any other WAN. The telephony-enabled network (hereinafter simply "telephony network") 6 may be, for example, the Public Switched Telephone Network (PSTN). Alternatively, however, the telephony network 6 and the WAN may be the same network, such as the Internet. Hence, the telephony network 6 may be a network based on Internet Protocol (IP) telephony and/or Voice over Internet Protocol (VoIP).

A server 3 is a platform on which a speech recognizer (not shown) and an application 4 execute. (It will be understood that references to an "application 4" in this description are references to a speech-enabled application.) A server 3 interfaces with an application 4 using an Application Programming Interface (API). An application 4 engages a user in a voice dialog, during which the application 4 renders a service to the user. A browser application 4A is a privileged type of application 4 that enables a user to switch from one content application 4B to another. An example of a voice browser is described in U.S. patent application Ser. No. 09/203,155, entitled, "System and Method for Browsing a Voice Web," filed on Dec. 1, 1998, which is incorporated by reference herein.

A client 2 executes on a gateway 1 to provides access to a server 3 and is interfaced to the gateway 1 using an API. A client 2 in general interfaces with a server 3 using a Voice Web protocol, described below. As noted, there are two types of client 2. A browser client 2A interfaces with the server 3A of the browser 4A. A content client 2B interfaces with the server 3B of a content application 4B.

A VCS in this architecture includes a server 3 executing an application 4. As the user speaks, the gateway 1 endpoints the user's utterance, and the speech recognizer in the appropriate server 3 recognizes it. Hence, this architecture separates the telephony infrastructure from the application, by a network, such as a WAN. The application 4 generates prompts, the server 3 sends the prompts over the network, and the gateway 1 plays the prompts to the user over the telephone 7 via the telephony network 6. Thus, the gateway 1 provides the VCSs with an interface to the telephony network 6 and performs the telephony functions and endpointing of speech (as well as voice hyperlinking and hotword logic, described further below), while the remote server 3 performs the speech recognition and executes the dialog. Optionally, however, the gateway 1 could include a "small-footprint" speech recognizer, such as for hotword recognition only. It may be desirable to perform hotword recognition in the gateway 1 to reduce the use of bandwidth between the gateway 1 and the VCSs 5.

The division of functionality between the gateway 1 and the servers 3 may be based on the Internet Protocol (IP) transport of endpointed speech from the gateway 1 to the servers 3 and the transport of recorded and/or synthesized speech (prompts) from servers 3 to the gateway 1. In one embodiment, the speech transmitted in each direction (i.e., prompts and user utterances) is sent as part of the payload of HyperText Transfer Protocol (HTTP) requests and responses. This allows speech to be transported on a WAN on which there is poor or non-guaranteed QoS, such as the Internet. An alternative approach is to use Voice-over-IP (VoIP) protocols for this purpose. However, the Transmission Control Protocol (TCP), which underlies HTTP, provides reliable transport, whereas the Real-Time Protocol (RTP), which underlies VoIP, does not. Thus, VoIP may not be a desirable alternative with the current Internet. Nonetheless, other protocols may be substituted for HTTP in other embodiments, for some or all of the communications described herein. For example, TCP may be substituted for HTTP. Alternatively, the User Datagram Protocol (UDP) might be used for transmission of control messages and/or audio between any of the speech applications 4 and the gateway 1. As yet another alternative, RTP might be used for the transmission of speech for embodiments in which the network guarantees a minimum acceptable QoS. Reliable speech transport is, of course, a prerequisite for reliable speech recognition.

It must be recognized that there will be some latency associated with the illustrated architecture, particularly when the gateway 1 and the VCSs are separated by a WAN, such as the Internet. However, it is believed that the amount of latency will be acceptable to most users when the techniques described herein are employed.

The prompts AND utterances exchanged between the gateway 1 and a speech application 4 can be encoded using any of a number of conventional encoding formats. Determination of which format to use can be accomplished at the beginning of a call by negotiation of the Multipurpose Internet Mail Extensions (MIME) entity type, as currently provided for by HTTP. Examples of encoding formats that may be suitable are the encoding formats described in International Telecommunication Union (ITU) Recommendations G.711 (November 1988), G.723 (March 1996), G.728 (September 1992) and G.729 (March 1996).

Figure 2A:
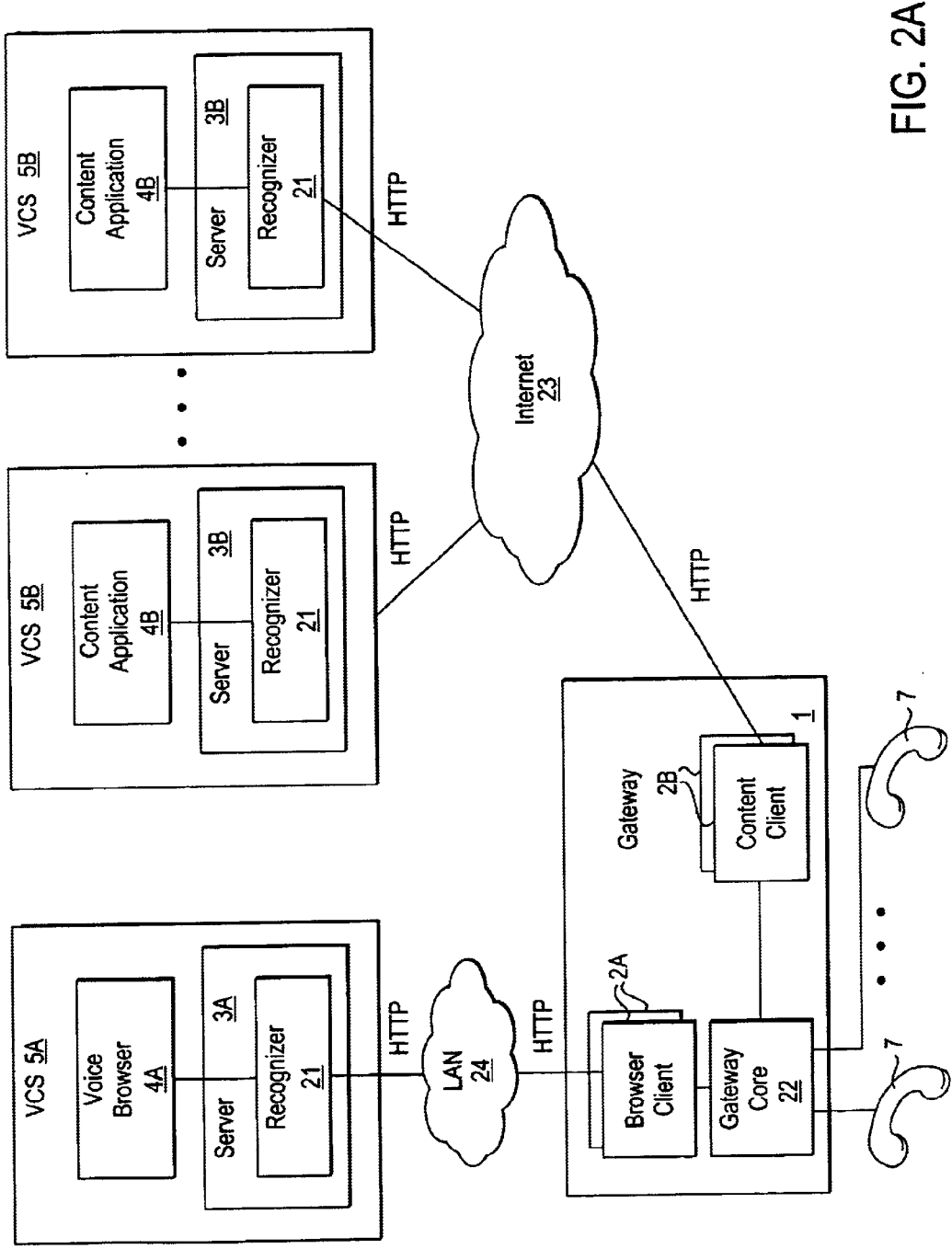
FIG. 2A shows an implementation of the architecture of FIG. 1.

FIG. 2A shows one implementation of the architecture of FIG. 1. A gateway 1 is connected to a VCS 5A of a browser 4A through a LAN 24, which may be a corporate intranet, for example. The VCS 5A includes server 3A, which executes a speech recognizer 21 and which hosts the voice browser 4A. A number of other VCSs 5B are connected to the gateway 1 via the Internet (or any other WAN) 23. Each of the VCSs 5B also includes a server 3B, which executes a speech recognizer 21 and hosts one or more content-oriented speech applications 4B.

The gateway 1 is connected to one or more users' telephones 7 via the telephony network 6 (see FIG. 1). The gateway 1 includes browser client 2A, content client 2B, and a gateway core 22. The browser client 2A enables the gateway 1 to interact with the browser's server 3A, while the content client 2B enables the gateway 1 to interact with the content sites 5B. The gateway core 22 controls and coordinates the operation of the gateway 1.

Figure 2B:
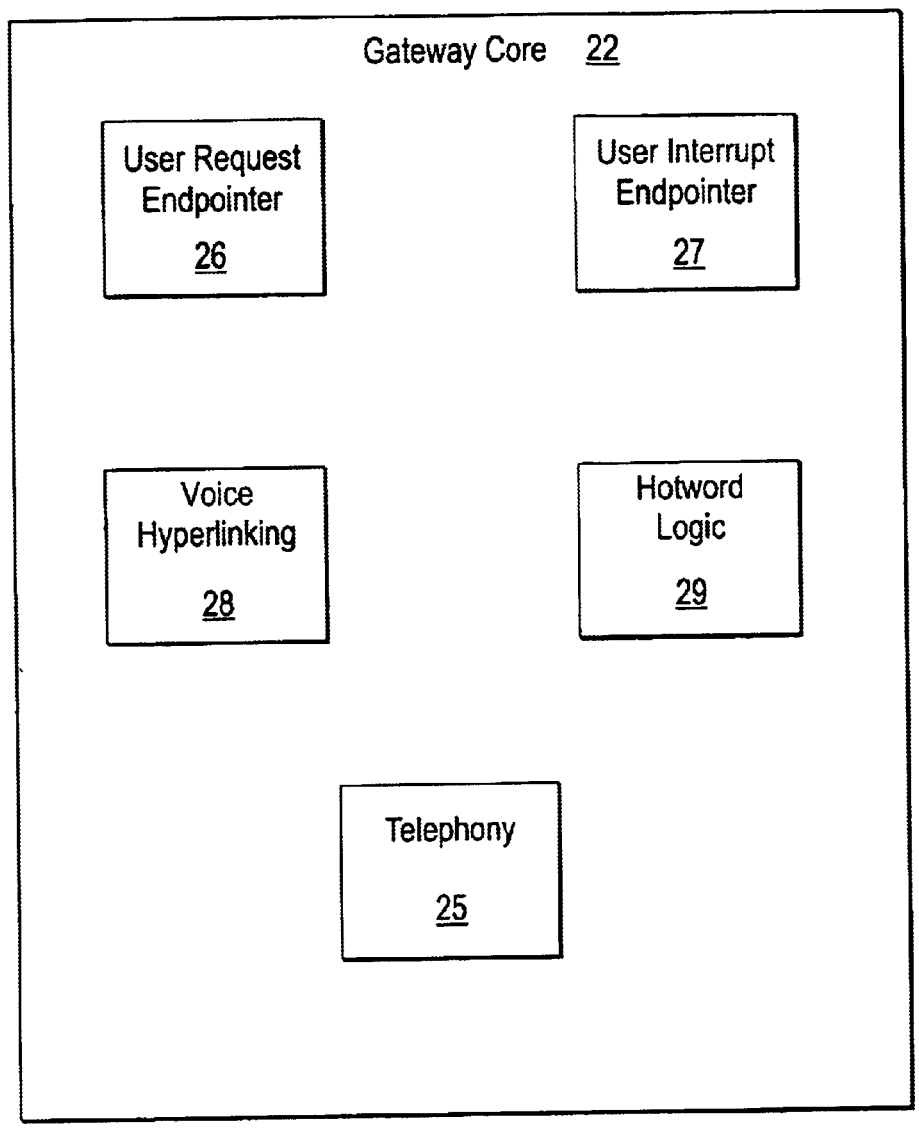
FIG. 2B illustrates the internal components of the gateway core.

FIG. 2B illustrates the internal components of the gateway core 22, according to one embodiment. The gateway core 22 includes a telephony interface 25, a user request endpointer 26, a user interrupt endpointer 27, voice hyperlinking logic 28, and hotword logic 29. The telephony interface 25 provides a connection to the telephony network 6 (see FIG. 1) and may include components (not shown) for processing speech of the user received over the telephony network 6. These components may include, for example, components which perform call control, echo cancellation, buffering, DTMF tone generation and/or detection, etc. Optionally, the gateway 1 may include a small-footprint speech recognizer, such as for hotword recognition. It may be desirable to perform hotword recognition in the gateway 1 to reduce the use of bandwidth between the gateway 1 and the VCSs 5.

Each of the endpointers 26 and 27 is a component which performs the task of endpointing, which may be defined as detecting a period of speech delimited by periods of non-speech before and after the speech. Endpointing is well understood in the art of speech recognition. Endpointing is performed based on endpointing parameters, which constrain the lengths of the periods of speech and silence and the length of the utterance as a whole. As described below in detail (see "V. Voice Web Interface"), the two endpointers 26 and 27 use separate sets of endpointing parameters, which is advantageous for purposes such as hotword recognition. Note, however, that while endpointers 26 and 27 are shown as separate units, certain components and/or functions may be shared between them.

The hotword logic is logic which controls where a given endpointed utterance is sent, based on whether the hotword endpointing parameters are satisfied, as described further below. The voice hyperlinking logic is logic which allows the gateway 1 to activate a voice hyperlink in response to speech from a user, to provide the user with voice access to a selected VCS, as also described further below.

Note that in alternative embodiments of the Voice Web, other types of networks may be substituted for the WAN 23, the LAN 24, or both. For example, a WAN or a direct (point-to-point) connection can be substituted for LAN 24. Similarly, a LAN can be substituted for WAN 23. Thus, the gateway 1 may be connected to the browser's VCS 5A and other VCSs 5B through the same network, such as the Internet, rather than two separate networks as shown.

As shown in FIG. 2A, the gateway 1 may be designed to be shared by multiple users accessing the Voice Web concurrently. A gateway 1 designed to allow concurrent use by N (multiple) users may include N browser clients 2A and N content clients 2B coupled to a gateway core 22. In such an embodiment, the gateway 1 may be implemented as part of the telephone switching fabric (e.g., the PSTN). Alternatively, the gateway 1 may be a personal gateway designed for use by one user at a time, in which case the gateway only needs to include one browser client 2A and one content client 2B. A personal use gateway may be implemented within a single telephony end user device, such as a telephony-enabled computer system, as discussed further below. Also, note that a browser client 2A or a content client 2B may be configured to support multiple users concurrently, rather than using a separate browser client 2A and content client 2B for each user.

The Voice Web architecture described above may be implemented using well-known, conventional hardware. For example, each of the VCSs 5A and 5B and the gateway 1 may be implemented in one or more conventional computer systems, such as a personal computer (PC), a workstation, or the like. FIG. 3 is a high-level block diagram of such a computer system. The illustrated computer system includes a microprocessor 31, memory 32, a data communication device 33, and one or more input/output (I/O) devices 34, coupled to each other by a bus system 35. Memory 32 represents any one or more of components such as: Random Access Memory (RAM), Read-Only Memory (ROM), or a mass storage device (e.g., magnetic disk or tape, magneto-optical (MO) storage device, flash memory, any of various types of Digital Versatile Disk (DVD) or compact disk (CD) storage). The bus system 35 may include one or more physical buses coupled to each other through one or more bridges, controllers and/or adapters. For example, the bus system 35 may include a "system bus" coupling the microprocessor 31 to RAM and coupled to one or more peripheral buses, such as a Peripheral Component Interconnect (PCI) bus or the like. The data communication device 33 may be any device suitable for enabling the computer system to communicate data with another computer or other type of processing system over a data communication link 36, such as a conventional telephone modem, a cable modem, an Integrated Services Digital Network (ISDN) adapter, a Digital Subscriber Line (DSL) modem, an Ethernet adapter, etc. In the case of the gateway 1, the communication device 33 may include a conventional telephony interface for receiving speech of a user. The one or more I/O devices 34 may include, for example, any of the following, depending on how the system is to be used: a pointing device, such as a mouse, trackball, touchpad, etc.; a display device, such as a Cathode Ray Tube (CRT), a Liquid Crystal Display (LCD), or the like; audio speakers; a microphone, etc. Of course, such I/O devices may not be necessary if the system requires no direct user interface.

Alternatively, some or all of the hardware of FIG. 3 may be replaced by one or more integrated circuits especially designed for the associated tasks. Such integrated circuits may include one or more Application Specific Integrated Circuits (ASICs), Programmable Logic Arrays (PLAs), Field Programmable Gate Arrays (FPGAs), etc., or a combination of such devices.

Note that a gateway 1 may be implemented in the form of multiple PCs equipped as described above, each terminating one or more PSTN connections. Conventional client/server technology can be used to provide the load balancing logic for routing calls to a specific PC. For example, a Domain Name Server (DNS) can be used to distribute calls to all of the gateway PCs using a round-robin scheme.

Figure 4:
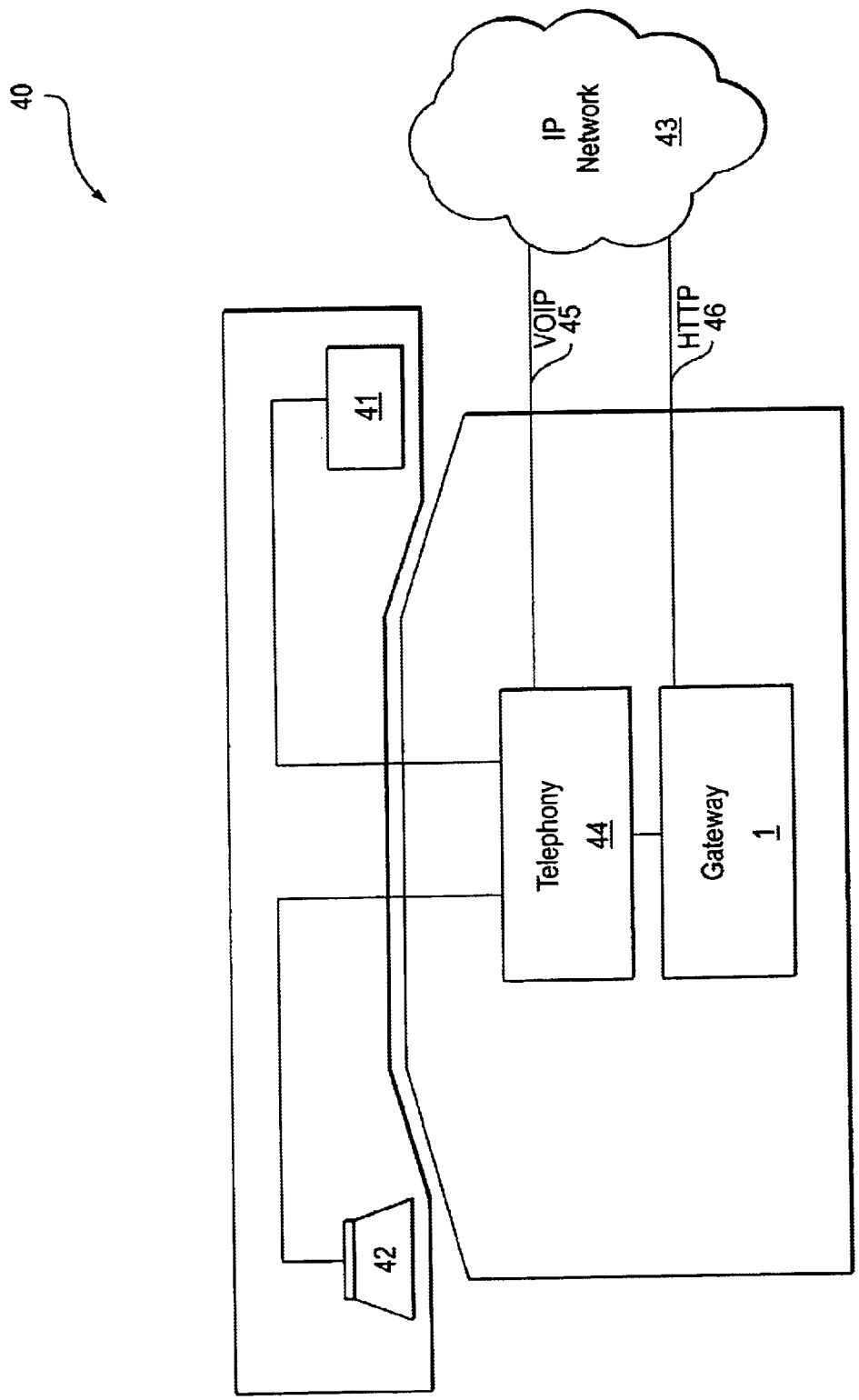
FIG. 4 shows a telephone end user device that includes a gateway.

FIG. 4 illustrates a telephony end user device 40, which may be a telephone handset, telephone base unit with headset or earpiece, a PC, etc., and which includes a gateway 1 such as described above. In the illustrated embodiment, the device 40 may be considered an "IP telephone"; that is, device 40 uses VoIP for user-to-user voice communication (telephony) over an IP network 43. The IP network 43 in this embodiment replaces the PSTN 6 (FIG. 1), the WAN 23 and the LAN 24 (FIG. 2A). The telephone includes a standard microphone and speaker 41 and 42, respectively, coupled to telephony-processing circuitry 44. Telephony-processing circuitry 44 is coupled to the IP network 43 by VoIP based link 45 for telephonic communication with other users. The telephony-processing circuitry 44 is also coupled to the gateway 1. The gateway 1 has an HTTP based (for example) connection 46 to the various VCSs described above via the IP network 43. As noted above, other protocols may be substituted for HTTP in other embodiments.

Figure 5:
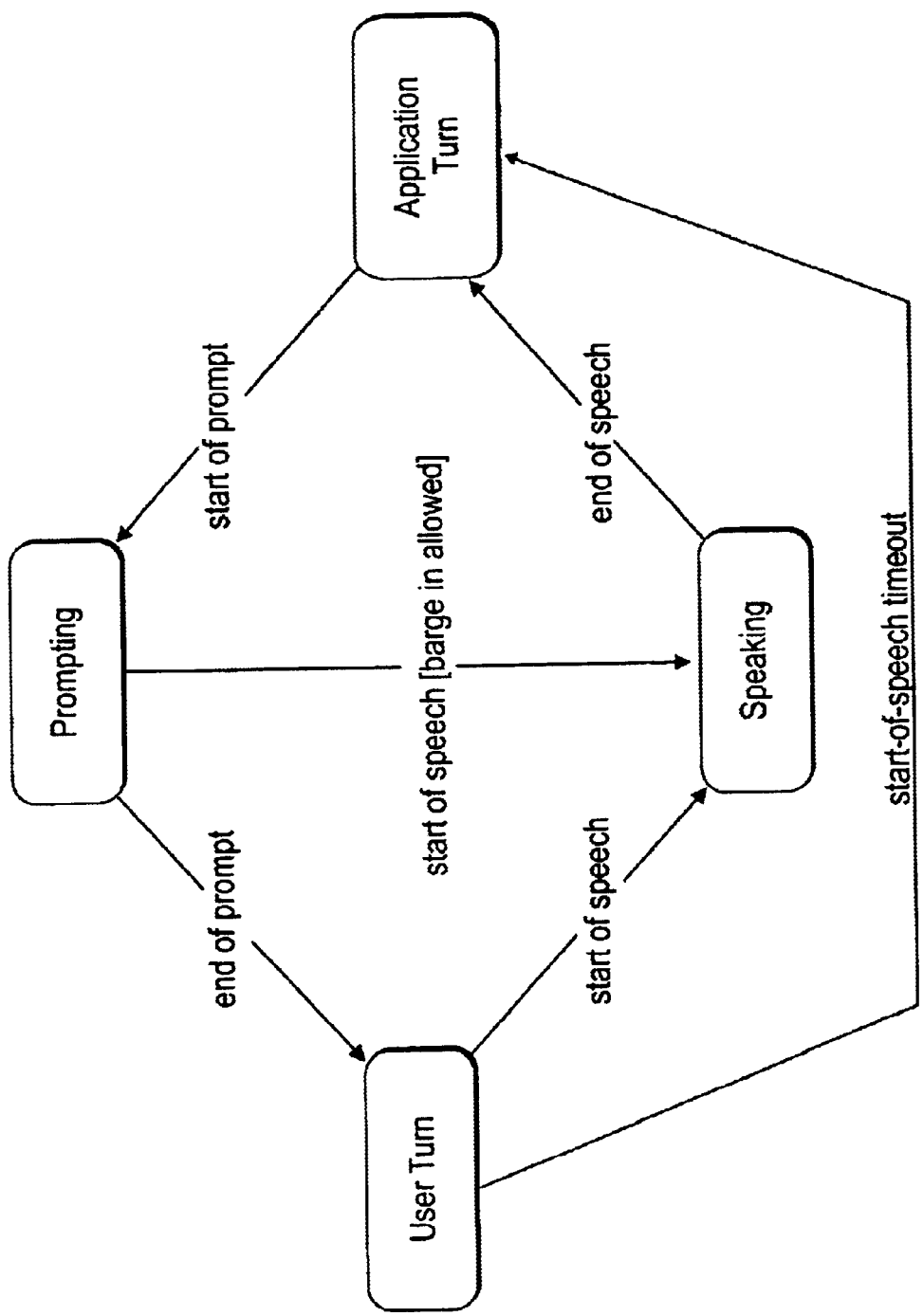
FIG. 5 is a state diagram illustrating the structure of a voice dialog on the Voice Web.

FIG. 5 is a state diagram illustrating the structure (rules) of a voice dialog, according to one embodiment. As shown, a user and an application engage in a dialog in which they take turns speaking. The application is not permitted to play a prompt to the user when either it is the user's turn to speak or the user is already speaking. Similarly, the user generally is not permitted to speak when either it is the application's turn to play a prompt or a prompt is being played. These rules have two exceptions. First, the user's turn to start speaking has a maximum duration, which the application controls. The user loses his turn by failing to speak within the time allotted. Second, if the user starts to speak while the application is playing a prompt, but not while it is merely the application's turn to do so, the user prevails if and only if the application has enabled a "barge in" feature.

II. Voice Web Component Classes

As noted above with respect to FIG. 1, the following classes of components are defined herein: a gateway 1, a client 2, a server 3, and a speech-enabled application 4. There are two types of client 2: a browser client 2A and a content client 2B. There are also two types of application 4: a browser 4A and a content-oriented application 4B. Server 3A in FIG. 1 is a server 3 that is associated with a browser 4A, while server 3B is a server 3 that is associated with a content-oriented application 4B.

The aforementioned components and other aspects of the Voice Web can be implemented using object-oriented programming practices (although that is not required). Therefore, to facilitate description, these components and other aspects of the Voice Web will now be further described in object-oriented terms, i.e., in terms of class hierarchies. The relationships between these components are also described and illustrated herein with the use of the Unified Modeling Language (UML). Hence, these components will be understood in terms of their "attributes" and "associations". An attribute of a component is information the component has. An "association" of a component is a communication path the component has to another component. (A class representing a component is said to "define" an attribute or association of the component.) This description treats each attribute or association, A, in one of three ways: (1) it assigns a default value to A—in this case A's run-time omission implies the use of the default value; (2) it assigns a condition to A—in this case A's run-time omission under that condition is a violation of the architecture; or (3) it does neither (1) nor (2)—in this case, it is implied that A is always present and, therefore, should not be omitted at run-time. In all three cases, A is public unless declared otherwise and dynamic unless declared static. A "public" attribute or association of a component is an attribute visible, or accessible, to other components. A "static" attribute is one associated with a class rather than with each instance of the class.

In the following description, attributes are defined using the notation, AttributeName: AttributeType, where AttributeName represents the name of the attribute and AttributeType represents the type of the attribute. A similar notation is used to define associations.

A telephone 7 is a telephony user device that can place an outgoing telephone call to a gateway 1, transmit audio bi-directionally and in real-time between a user and the gateway 1, and terminate the connection or respond to its termination by the gateway 1. A user "consumes" the services that the Voice Web provides by listening and speaking to applications 4 from a telephone 7. A telephone 7 is therefore a consumer class component in the Voice Web architecture. A gateway 1 may be contacted by a user by dialing a predetermined telephone number (or, by taking the user's telephone off-hook or the user opening a telephone application on a PC, etc). Therefore, a telephone 7 has an attribute, gatewayDN: String, which is the telephone number dialed to reach the gateway 1. A telephone 7 also may have an association, gateway: VoiceWebGateway, which is the gateway 1 to which the telephone 7 is connected during a dialog. This association is present if and only if the telephone 7 is connected to the gateway 1.

Figure 6A:
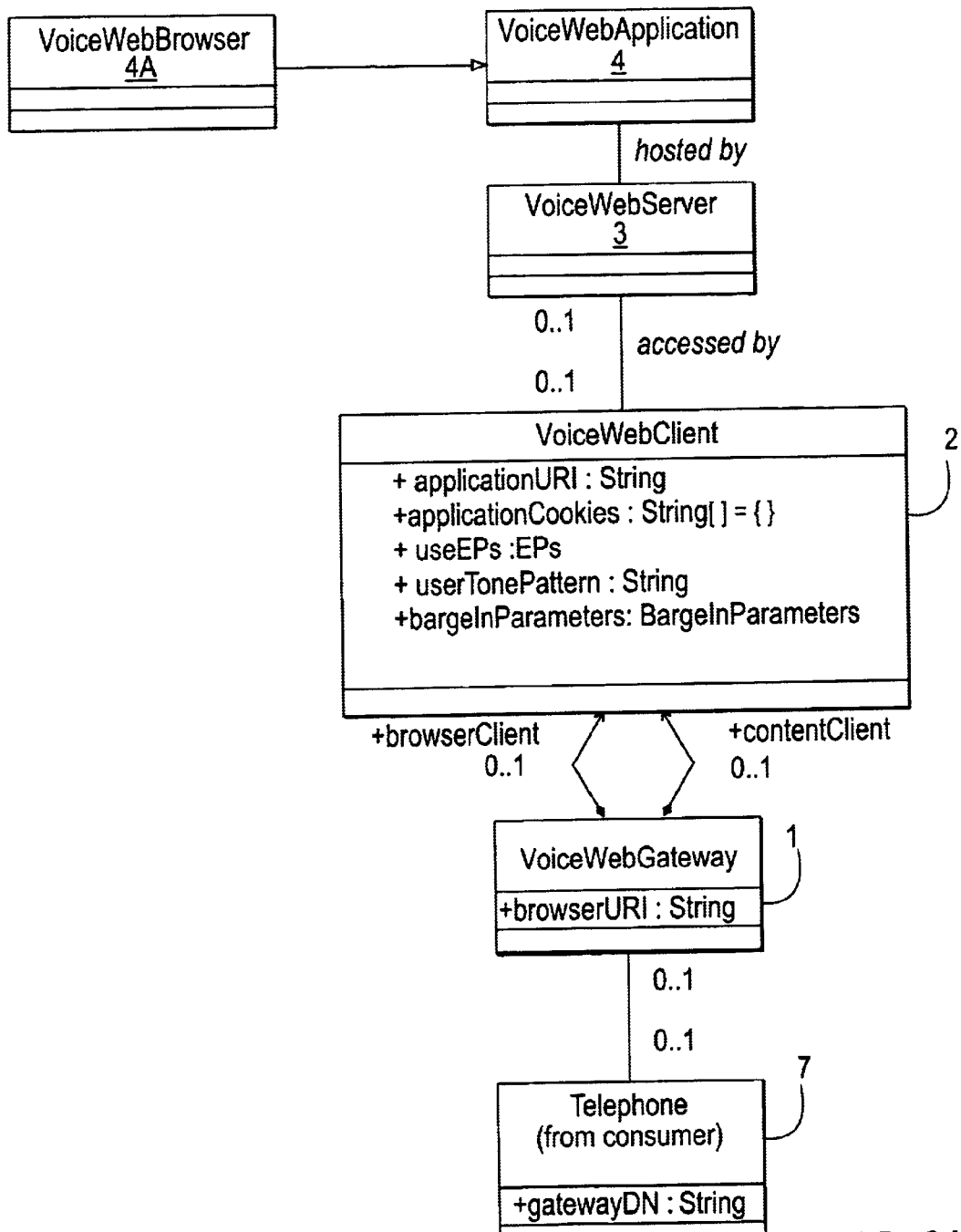
FIG. 6A illustrates the hierarchy of provider type components.

A second kind of component is the provider class. In the Voice Web architecture, the components that are providers are the gateway 1, the client 2, the server 3, and the application 4. FIG. 6A illustrates the hierarchy of provider components (using UML notation, which is also used in FIGS. 6B through 10C), with the attributes of the various components.

The gateway 1 allows a user to access various VCSs on the Voice Web from a telephone 7. As shown in FIG. 2A, the gateway 1 may be shared between multiple users. If the gateway 1 is configured to allow concurrent use by N users, the gateway 1 includes N browser clients 2A and N content clients 2B. At any given time, the gateway 1 equips a user with either a browser client 2A or both a browser client 2A and a content client 2B.

A gateway 1 has the Following Associations:

telephone: Telephone—the user's telephone. This association is present if and only if the telephone 7 is connected to the gateway 1.

browserClient: VoiceWebClient—the particular browser client 2A involved in a given session. Initially, the browser client's applicationURI attribute is a copy of the browserURI attribute of the gateway itself, and its other attributes are absent. This association is present if and only if the telephone association is present. As noted above, a browser client 2A may alternatively be configured as a multi-user client.

contentClient: VoiceWebClient—the particular content client 2B involved in a given session. This association is present if and only if the connected user is interacting with an application 4 other than the browser 4A, i.e., a content-oriented application 4B. As noted above, a content client 2A may alternatively be configured as a multi-user client.

The gateway 1 provides voice hyperlinking capability to allow a particular user to access multiple VCSs 5 sequentially. The gateway 1 can follow a voice hyperlink directly or indirectly. Specifically, the gateway 1 can access a selected content application 4B using voice hyperlink control information received from another content application 4B, or it can instead forward the voice hyperlink control information to the browser 4A.

The "current application" is the application that is accessible through the current client. The "current client" is either the browser client 2A or the content client 2B. The client designated as "current" changes as a result of user and application events. The gateway 1 acts as a voice conduit between the user and one or two applications 4 at any given instant.

Note that the architecture described herein is an event-driven architecture, as described further below. Events are "fired" (signaled) by the browser 4A, the gateway 1, or a content application 4B. The gateway 1 transports user utterances and/or tone sequences qualifying as user events (described below) from the user to the current application via requests. The gateway 1 transports application prompts from the current application 4 representing application events (described below) to the user via responses. In addition, if the browser 4A is not the current application, the gateway 1 transports user utterances and/or tone sequences qualifying as interrupt candidates (described below) from the user to the browser 4A via requests. Note that the current application may change over time as the browser 4A authorizes the gateway 1 to substitute one client 2, and thus one application 4, for another.

A client 2 gives a user access to an application 4 and supports a dialog between the user and the application 4. It does so via the server 3 that hosts the application. A browser client 2A gives the user access to a browser 4A. A content client 2B, if present, gives the user access to a second application 4B. A client 2 of either type has the following attributes:

applicationURI: String—the Uniform Resource Identifier (URI) of the application.

applicationCookies: String[ ]13 the zero or more HTTP cookies that are germane to the application. Cookies allow an application 4 to maintain state within a user session, and further allow state to be maintained between sessions if provided to the browser 4A. A cookie is stored in the gateway 1 by a speech application 4 along with a prompt; the gateway 1 sends the same cookie to the application 4 along with the next endpointed speech it transmits. The gateway 1 may send a cookie received from a content application 4B to the browser 4A and, similarly, it may send a cookie received from the browser 4A to a content application 4B; this enables the browser 4A to allow the content application 4A to maintain state between user sessions. Cookies may be used, among other things, to identify the user to a VCS 5.

userEndpointingParameters: EndpointingParameters—the endpointing parameters that an utterance must satisfy to qualify as the next user event. This attribute is present if and only if some utterance can qualify.

userToneSequencePattern: String—the pattern that a tone sequence must satisfy to qualify as the next user event. This attribute is present if and only if some tone sequence can qualify.

bargeInParameters: BargeInParameters—the parameters that constrain the transition from the last application prompt (if any) to the next user utterance or tone sequence. This attribute is present if and only if either the userEndpointingParameters attribute or the userToneSequencePattern attribute is present.

server: VoiceWebServer—the server 3. This association is present if and only if the server 3 owes the client 2 a response to a previous request.

The applicationURI attribute of the client 2 is tied to the same attribute of each request sent to the application and each response received from the application (in support of the dialog with the user). This attribute of the request is set to a copy of this attribute of the client 2. Furthermore, this attribute of the client 2 is set to a copy of this attribute of the response. Note that URIs and cookies circulate between the client 2 and the application 4 as messages flow between them.

Referring still to FIG. 6A, a server 3 hosts an application 4. In fact, a server 3 may host any number of applications 4 (although only one application 4 is shown) and may support any number of users, as shown in FIG. 2A. By communicating with a user's client 2, a server 3 enables an application 4 to engage the user in a dialog. A server 3 has the following associations:

application: VoiceWebApplication—a Voice Web application.

client: VoiceWebClient—a Voice Web client 2. This association is present if and only if the server 3 owes a client 2 a response to a previous request.

An application 4 engages a user in a dialog by producing application prompts and consuming user utterances. A single application 4 may support multiple users. An application 4 is hosted by a server 3. An application 4 has the association, server: VoiceWebServer, which is the server 3 that hosts the application 4.

A browser 4A, which controls the operation of a gateway 1, is a special type of an application 4. The privileges and/or special functions of the browser 4A application are noted throughout this description. In one embodiment, the browser 4A has no special attributes or associations by virtue of its being a browser; however, it does have the attributes and associations of an application 4. Note that in certain embodiments, a browser 4A may not provide the capability to engage the user in a dialog, providing only the capability to respond to requests from the user's browser client 2A. A browser 4A can direct the gateway to follow a voice hyperlink or respond to a user navigation command, such as "go forward" or "go back".

In addition, the browser 4A may be configured to perform speaker identity verification on behalf of the various VCSs 5. In this case, the browser 4A may verify the identity of the user based on the user's endpointed speech received from the gateway 1, using conventional verification processes. The browser 4A may then provide one or more messages to the gateway 1 indicating the identity of the speaker or a true/false outcome of the verification process, for example. The gateway 1 can then provide this information to other speech applications 4B when the user attempts to access those applications.

III. Voice Web Events

A dialog between a user and an application 4 is made possible by communication between a client 2 and a server 4. These two types of components communicate in response to events that affect the dialog. Some events are fired (signaled) by the gateway 1 on behalf of the user ("user events"). Others are fired by an application 4 by means of a server 4 ("application events"). Some of the events in each category are relevant only when the application 4 is the browser 4A.

Figure 6B:
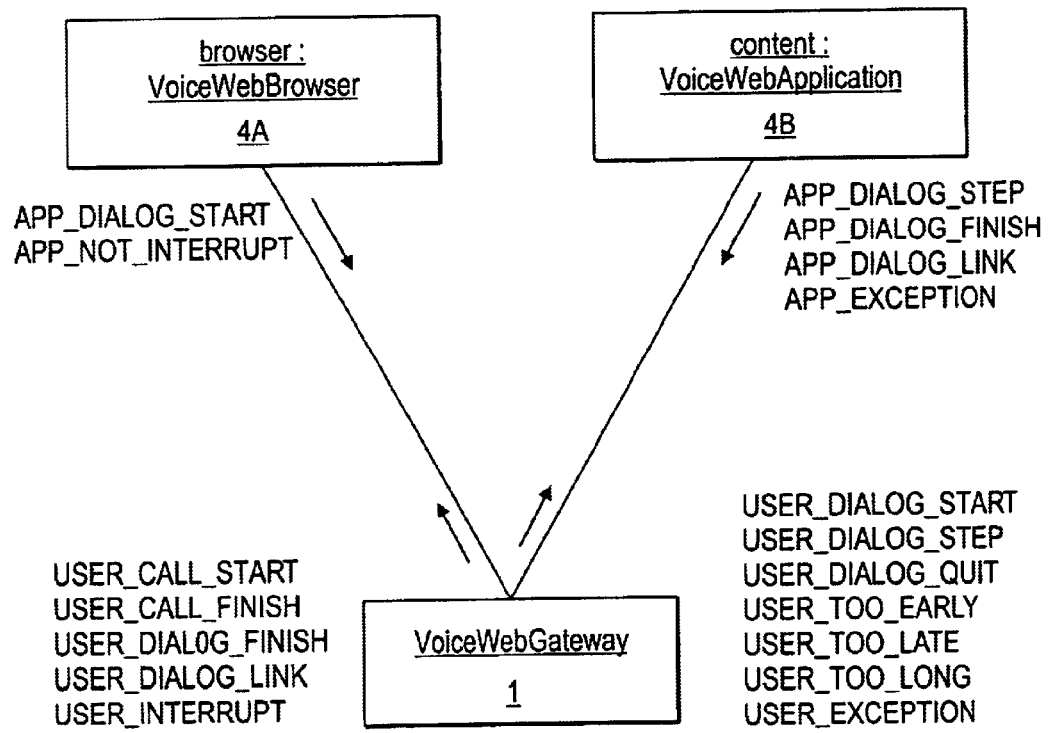
FIG. 6B shows the firing of events by various components.

Events are fired among the gateway 1 and the user's browser 4A and content application 4B as shown in FIG. 6B. Note that there may be no content application 4B, although FIG. 6B depicts the situation in which one is present. Also, recall that the browser 4A itself is an application 4. Thus, although not shown in FIG. 6B, note that the events fired between the gateway 1 and the content application 4B are also fired between the gateway 1 and the browser 4A. In addition, events fired between the gateway 1 and an application 4 (e.g., the browser 4A) transit a client 2 and server 4 (also not shown).

Two event classes are defined in the Voice Web architecture, user events and application events. A user event is fired by the gateway 1, whereas an application event is fired by an application 4.

A. User Events

A user event denotes an act of a user that affects his or her dialog with an application 4. The user's gateway 1 fires such events at applications 4. The particular events denoted by attributes defined by the user event class (not its subclass) are fired at the user's current application.

The user event class defines the following static attributes to denote dialog events:

USER_DIALOG_START: UserEvent—the event fired when the gateway detects an APP_DIALOG_START event.

USER_DIALOG_STEP: UserEvent—the event fired when the user request endpointer or pattern matcher locates a user request.

USER_DIALOG_QUIT: UserEvent—the event fired when the gateway learns that a user interrupt candidate has been recognized as a user interrupt.

The user event class defines the following static attributes to denote dialog exception events:

USER_TOO_EARLY: UserEvent—the event fired when the user request endpointer 26 (FIG. 2B) fails to locate a user request because the user fails to satisfy the minStartSilence endpointing parameter (discussed below).

USER_TOO_LATE: UserEvent—the event fired when the user request endpointer 26 fails to locate a user request because the user fails to satisfy the maxStartSilence endpointing parameter (discussed below).

USER_TOO_LONG: UserEvent—the event fired when the user request endpointer 26 fails to locate a user request because the user fails to satisfy the maxSpeech endpointing parameter (discussed below).

The user event class defines the following static attributes to denote exception events:

USER_EXCEPTION: UserEvent—the event fired to report an exceptional condition that concerns the application.

The user event class also defines the (non-static) attribute, code: integer, which represents the code that denotes this user event. It is protected.

The user event class also defines the constructor, UserEvent(code: integer), which represents the event denoted by the code. It is protected.

B. Application Events

An application event denotes an act of an application 4 that affects its dialog with a user. Applications 4 fire such events at the user's gateway 1. The particular events denoted by attributes defined by the application event class (not its subclass) are fired by the user's current application.

The application event class defines the following static attributes to denote dialog events:

APP_DIALOG_STEP: ApplicationEvent—the event fired to continue the dialog between the user and the application 4 by including the next user request in the dialog.

APP_DIALOG_FINISH: ApplicationEvent—the event fired to finish the dialog between the user and the application 4 by excluding the next user request from the dialog.

APP_DIALOG_LINK: ApplicationEvent—the event fired to finish a dialog between the user and the application 4 by excluding the next user request from the dialog and to follow a voice hyperlink using the client through which the application is accessed. When the browser 4A fires this event, it asks the gateway 1 to install a replacement browser. After identifying the user, e.g., the browser 4A might replace itself with a user-specific browser.

To denote exception events, the application event class defines the static attribute, APP_EXCEPTION: ApplicationEvent, which represents the event fired to report an exceptional condition that concerns the gateway 1. The application event class also defines the (non-static) attribute, code: integer, which represents the code that denotes this application event; it is protected. The application event class defines the constructor, ApplicationEvent(code: integer), which represents the event denoted by the code; it is protected.

C. Browser-Specific Events

Certain user events and application events are specific to a browser 4A, as will now be described.

C1. Browser User Events

A browser user event is fired at the browser 4A. The browser user event class defines the following static attributes to denote telephony events:

USER_CALL_START: BrowserUserEvent—the event fired when the user's incoming telephone call is answered.

USER_CALL_FINISH: BrowserUserEvent—the event fired when the user's incoming telephone call is terminated (even by the gateway itself).

The browser user event class defines the following static attributes to denote dialog events:

USER_DIALOG_FINISH: BrowserUserEvent—the event fired when the gateway 1 detects an APP_DIALOG_FINISH event not fired by the browser 4A.

USER_DIALOG_LINK: BrowserUserEvent. The event fired when the gateway 1 detects an APP_DIALOG_LINK event not fired by the browser 4A.

The browser user event class defines the static attribute, USER_INTERRUPT: BrowserUserEvent, to denote interrupt events. This attribute represents the event fired when the user interrupt endpointer or pattern matcher locates a user interrupt candidate.

The browser user event class defines the following constructor, BrowserUserEvent(code: integer), which represents the event denoted by the code. It is protected.

C2. Browser Application Events

A browser application event is fired by the browser 4A. The browser application event class defines the following static attributes to denote dialog events:

APP_DIALOG_START: BrowserApplicationEvent—the event fired to instate an application 4 as the content application 4B and to start a dialog between it and the user. Note that the browser 4A may (but need not) fire this event in eventual reaction to a USER_DIALOG_LINK event or for any other reason (e.g., to implement a "go-backward" or "go-forward" command that returns the user to an application 4 he or she visited before).

The browser application event class defines the static attribute APP_NOT_INTERRUPT: BrowserApplicationEvent, to denote interrupt events, which represents the event fired when the browser 4A fails to recognize a user interrupt candidate as a user interrupt.

The browser application event class defines the constructor, BrowserApplicationEvent(code: integer), which represents the event denoted by the code. It is protected.

D. Exceptions

Some of the events regarding which a gateway 1 and a server 3 communicate may be exceptions. Some exceptions may be detected by the gateway 1, while others may be detected by a server 3. Hence, the Voice Web architecture also uses two classes of exceptions: user exceptions and application exceptions.

D1. User Exceptions

A user exception denotes an exception detected by the gateway 1. The user exception class may define the (non-static) attribute, code: integer, which represents the code that denotes this user exception. It is protected.

The user exception class may also define the constructor, UserException(code: integer), which represents the exception denoted by the code. It is protected.

D2. Application Exceptions

An application exception denotes an exception detected by a server 3. The application exception class may define the (non-static) attribute, code: integer, representing the code that denotes this application exception. It is protected.

The application exception class may define the constructor, ApplicationException(code: integer), representing the exception denoted by the code. It is protected.

IV. Voice Web Messages

Figure 7:
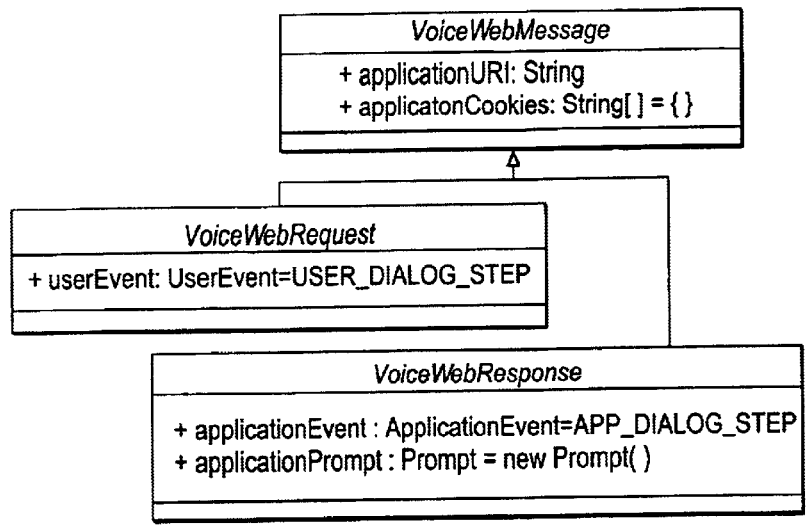
FIG. 7 shows the hierarchy of message types.

Referring now to FIG. 7, a client 2 and a server 3 communicate on the Voice Web by exchanging Voice Web Messages (or simply "messages"). FIG. 7 shows the hierarchy of message types, with their attributes. There are two types of messages: Voice Web requests (or simply "requests") and Voice Web responses (or simply "responses"). A client 2 sends requests to the server 3. A server 3 sends correlated responses to the client 2 to acknowledge the requests.

A Voice Web message advances a dialog between a user and the application 4 that sends or receives the message (if the message is a response or a request, respectively). Each Voice Web message has the following attributes:

applicationURI: String—the URI of the application. This attribute is always present in a request. In a response, this attribute defaults to the same attribute of the request.

applicationCookies: String[]—the zero or more cookies that are germane to the application 4.

A. Voice Web Requests

A request advances a dialog between a user and the application 4 that receives it. It does so by reporting a user event to the application 4. A request has the following attributes:

userEvent: UserEvent the user event. This attribute defaults to the USER_DIALOG_STEP event.

Two terms shall now be defined. The "sender" of a request is either the gateway 1 that produces the request or the client 2 that actually sends the request. The "receiver" of a request is either the server 3 that actually receives the request or the application 4 to which the request pertains. In either case, which of the two components is meant will be apparent from context.

Figure 8:
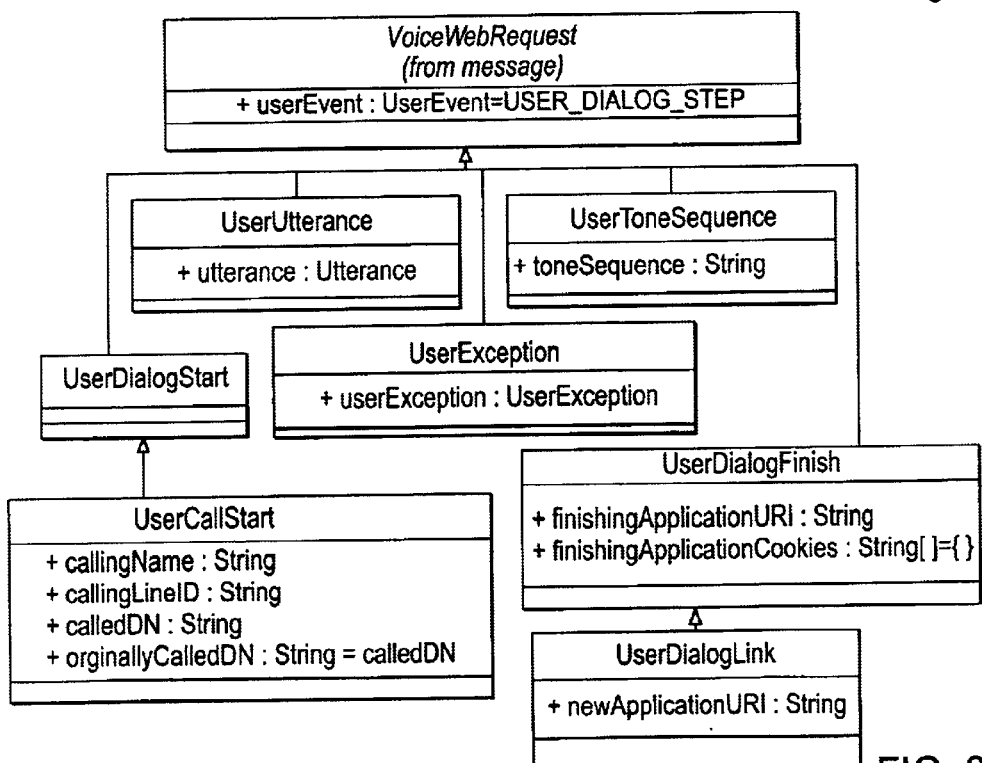
FIG. 8 shows the hierarchy of request types.

A request reports a user event and conveys information about the event. The information requirements of the various events give rise to various subclasses of a request, which are illustrated in FIG. 8. As shown, the following subclasses of a request may be defined (wherein indentation denotes subclassing here and elsewhere in this description):

UserDialogStart
    UserCallStart*
UserDialogFinish*
    UserDialogLink*
UserUtterance
UserToneSequence
UserException
Pertains only to a browser 4A.

A UserCallStart request reports the USER_CALL_START event. This class of request defines the following attributes:

callingName: String—the name of the telephone caller as provided by the telephone network. This attribute is present if and only if the network permits its disclosure.

callingLineID: String—the telephone number of the caller as provided by the telephony network. This attribute is present if and only if the network permits its disclosure.

calledDN: String—the telephone number the telephone network used to reach the user's gateway 1.

originallyCalledDN: String—the telephone number the caller dialed to reach the user's gateway 1. This attribute defaults to the calledDN attribute.

Note that the calledDN and originallyCalledDN attributes differ, for example, in the face of call forwarding or "800" number service.

A UserDialogStart request reports the USER_DIALOG_START event. This class defines no attributes.

A UserDialogFinish request reports the USER_DIALOG_FINISH or USER_CALL_FINISH event. This class defines the following attributes:

finishingApplicationURI: String—a copy of the applicationURI attribute of the user's content client 2B.

finishingApplicationCookies: String[ ]—a copy of the applicationCookies attribute of the user's content client 2B. This attribute defaults to none.

A UserDialogLink request reports the USER_DIALOG_LINK event. This class defines the attribute, newApplicationURI: String, which represents the URI of the desired application 4. (Instead, the URI could supply a telephone number for an outgoing telephone call.)

A UserUtterance request reports any of the following events: USER_DIALOG_STEP, USER_TOO_EARLY, USER_TOO_LATE, USER_TOO_LONG, USER_INTERRUPT, or USER_DIALOG_QUIT. This class of request defines the attribute, utterance: Utterance, which represents the utterance. This attribute defaults to one with default attributes.

A UserToneSequence request reports any of the following events: USER_DIALOG_STEP, USER_TOO_EARLY, USER_TOO_LATE, USER_TOO_LONG, USER_INTERRUPT, or USER_DIALOG_QUIT. This request class defines the attribute, toneSequence: String, which represents the tone sequence.

The UserException request class reports the USER_EXCEPTION event. This request class defines the following attribute, userException: UserException, which represents the user exception.

B. Voice Web Responses

Figure 9:
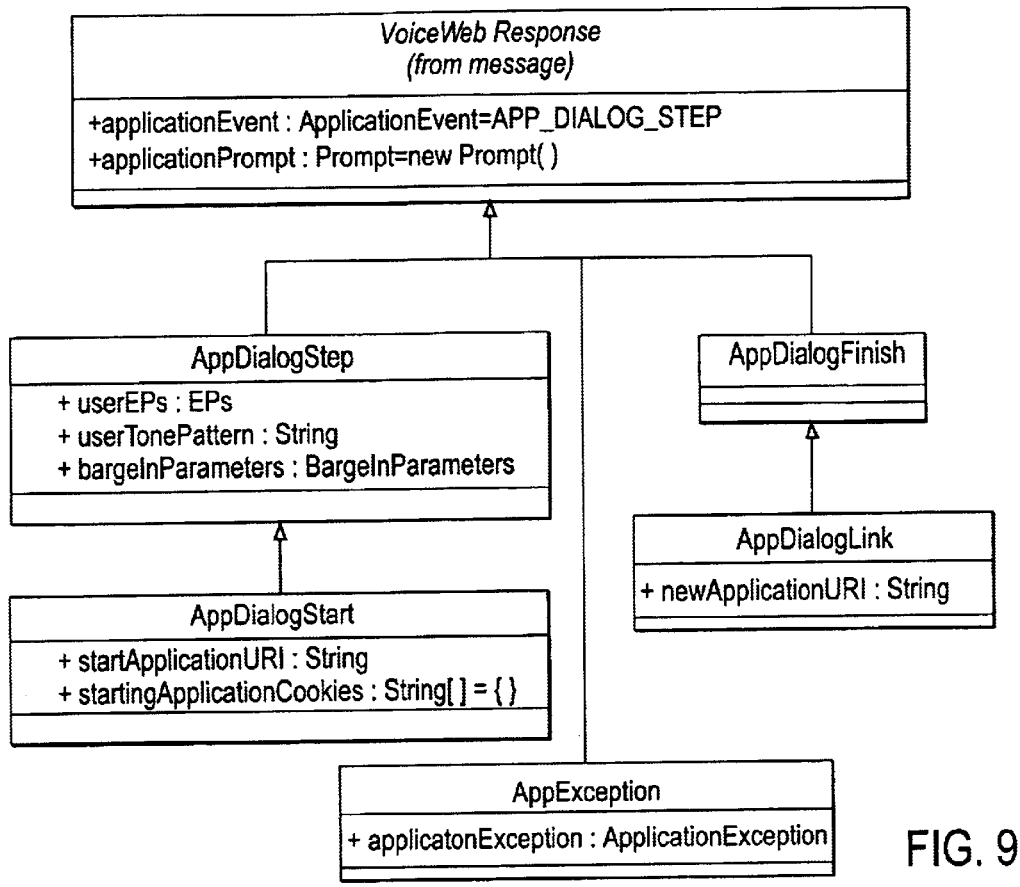
FIG. 9 shows the hierarchy of response types.

A Voice Web response advances a dialog between a user and the application 4 that sends the response. It does so by reporting an application event to the receiver. The response also acknowledges a prior request and the user event the request reported. The response does the latter with an application prompt which the receiver is to play for the user. FIG. 9 shows the hierarchy of Voice Web responses.

The response class defines the following attributes:

applicationEvent: ApplicationEvent—the application event. This attribute defaults to the APP_DIALOG_STEP event.

applicationPrompt: Prompt—the prompt. This attribute defaults to a prompt with default attributes.

Two additional terms shall now be defined. The "sender" of a response is either the application 4 to which the response pertains or the server 3 that actually sends the response. The "receiver" of a response is either the client 2 that actually receives the response or the gateway 1 that consumes the response. In either case, which of the two components is meant will be apparent from context.

A response reports an application event and conveys information about the event. The information requirements of the various events give rise to various subclasses of a Voice Web response. FIG. 9 illustrates the class hierarchies of Voice Web responses. Thus, the following response subclasses may be defined:

AppDialogStep
    AppDialogStart*
AppDialogFinish
    AppDialogLink
AppException
Pertains only to a browser 4A.

An AppDialogStart response reports the APP_DIALOG_START event. This response class defines the following attributes:

startingApplicationURI: String—a prototype of the applicationURI attribute of the content client 2B (and thus the URI of the desired application 4).

startingApplicationCookies: String[ ]—a prototype of the applicationCookies attribute of the content client 2B. This attribute defaults to none.

Upon receiving an instance of the AppDialogStart class, a gateway 1 starts the new dialog by constructing the user's content client 2B, setting attributes of the client 2 as specified above, and sending a UserDialogStart through the client 2. The inherited userEPs (described below) and userTonePattern attributes of an instance of this class (but not an instance of its subclass) constrain the next user interrupt (not user request). Therefore, the instance constrains its userEPs attribute so that the "setter" only consumes and the "getter" only produces an instance of the UserInterruptEPs class.

An AppDialogStep response reports the APP_DIALOG_STEP or APP_NOT_INTERRUPT event. This response class defines the following attributes:

userEPs: EPs—the endpointing parameters for the next user utterance. This attribute is present if and only if a user utterance can qualify.

userTonePattern: String—the tone pattern for the next user tone sequence.

This attribute is present if and only if a user tone sequence can qualify.

bargeInParameters: BargeInParameters—the barge-in parameters that constrain the transition from the present application prompt to the next user utterance or user tone sequence. This attribute is present if and only if the userEPs or userTonePattern attribute is present.

An AppDialogStep response also may specify the valid form of user input for hyperlinking, e.g., voice vs. DTMF tone.

Upon receiving an instance of this class, a gateway 1 stores copies of the instance's userEPs and userTonePattern attributes in the same attributes of the client through which it receives the instance. The userEPs and userTonePattern attributes constrain the next user request (not user interrupt). Therefore, this class constrains its userEPs attribute so that the setter only consumes and the getter only produces an instance of the UserRequestEPs class.

An AppDialogFinish response reports the APP_DIALOG_FINISH event. This response class defines no attributes.

An AppDialogLink response reports the APP_DIALOG_LINK event. This response class defines the attribute, newApplicationURI:String, which represents the URI of the desired application. (Instead, the URI could supply a telephone number for an outgoing telephone call.)

An AppException response reports the APP_EXCEPTION event. This response class defines the attribute, application-Exception: ApplicationException, which represents the application exception.

V. Voice Web Interface

An application's voice user interface includes application prompts, user utterances, and/or user tone sequences. The following description specifies: how a gateway 1 locates, classifies, and handles user utterances; how a gateway 1 locates, classifies, and handles user tone sequences; the components a gateway 1 uses to locate and classify user utterances; the parameters with which a gateway 1 guides those components; and, the possible elements of the user interface itself.

A. The User Utterance

A gateway 1 locates and classifies user utterances in the real-time audio stream that the user's telephone 7 produces. The gateway 1 provides special handling for user utterances it classifies as user interrupts. A user utterance is an audio segment that an application 4 and its server 3 are to process. The gateway 1 processes user utterances using two endpointers, i.e., a user request endpointer 26 and a user interrupt endpointer 27 (see FIG. 2B), each configured with endpointing parameters (the EPs class). The user interrupt endpointer 27 may be used for hotword endpointing. In alternative embodiments, a single dual-mode endpointer may be substituted for endpointers 26 and 27, such that the signal processing is shared but the state machines are separate for the two modes. Such an embodiment may reduce the amount of computation and memory required compared to having two separate endpointers, and may provide high channel density, for example.

As noted above, an endpointer locates a user utterance by detecting a period of speech delimited by periods of silence, i.e., start silence immediately preceding the speech and end silence immediately following the speech. In one embodiment, the endpointer includes in the utterance not only the speech but also a portion of the start silence and a portion of the end silence (to compensate for possible errors in speech detection). The endpointing parameters, which may vary from one utterance to the next, constrain the lengths of the periods of speech and silence and the length of the utterance as a whole.

The gateway 1 can use these endpointers in either of two different modes of operation, single endpointing mode or double endpointing mode.

A1. Single endpointing

In single endpointing mode, the gateway 1 uses only the user request endpointer 26. In one embodiment, the gateway 1 operates in this mode whenever the content client 2B is absent. In this mode, whenever the gateway 1 receives an AppDialogStep response through the browser client 2A, the gateway 1 activates the user request endpointer 26 after configuring it with the endpointing parameters in the client. If those parameters are not user request endpointing parameters, a user exception occurs.

A2. Dual endpointing

In dual endpointing mode, the gateway 1 uses both endpointers 26 and 27 (FIG. 2B). In one embodiment, the gateway 1 operates in this mode whenever the content client 2B is present. In this mode, whenever the gateway 1 receives an application dialog step through either client 2, the gateway 1 activates the user request endpointer 26 and user interrupt endpointer 27 after configuring them with the endpointing parameters in the content and browser clients 2B and 2A, respectively. If those parameters are not user request and user interrupt endpointing parameters, respectively, a user exception occurs.

The use of dual endpointers 26 and 27 allows the gateway 1 to locate user utterances of two kinds simultaneously. Specifically, a user request is a user utterance located using the user request endpointer 26. A user interrupt candidate is a user utterance located using the user interrupt endpointer 27. The dual endpointers are coupled, which allows the gateway 1 to determine whether a user request and a user interrupt candidate are "coupled", i.e., whether one interval of speech underlies both.

Note that in dual endpointing mode, the user interrupt endpointer 27 remains active even after the user request endpointer 26 locates a user request. This technique allows the gateway 1 to locate and respond to a user interrupt candidate while the content application 4B receives or responds to the report of the user request.

A3. Handling of User Interrupts

The gateway 1 locates a user interrupt candidate so that it can determine whether the candidate is a user interrupt. A user interrupt is a user interrupt candidate that the user intends as the first user request in a dialog with the browser 4A (rather than the content application 4B), such as a hotword.

In one embodiment, a user interrupt candidate is recognized as a user interrupt by the browser 4A. The gateway 1 sends the candidate to the browser 4A by firing the USER_INTERRUPT event. If the candidate is not a user interrupt, the browser 4A fires the APP_NOT_INTERRUPT event at the gateway 1 and takes no other action in response to the USER_INTERRUPT event. Otherwise the browser 4A fires any other event at the gateway 1 and begins a dialog with the user, using the response that reports the event.

If the user interrupt candidate is coupled to a user request, the gateway sends the user request to the content application 4B at the same time that it sends the user interrupt candidate to the browser 4A. In this way, delay is avoided for cases in which the candidate is not found to be an interrupt by the browser 4A. However, the gateway 1 does not complete the request it sends to the content application 4B until it receives the response from the browser 4A.

When the gateway 1 receives the browser's response, the gateway 1 completes the content application's request so that the request reports one of two events. The request reports the USER_DIALOG_QUIT or USER_DIALOG_STEP event if the user interrupt candidate is or is not a user interrupt, respectively. In the first case, the content application 4B fires an APP_DIALOG_FINISH event at the gateway 1 and takes no other action. Thus a user interrupt preempts a coupled user request.

B. The User Tone Sequence

The gateway 1 may locate and classify user tone sequences in DTMF signals produced by a user's telephone 7. The gateway 1 provides special handling for user tone sequences it classifies as user interrupts. A user tone sequence is a sequence of DTMF signals that an application 4 and its server 3 are to process. The gateway 1 processes user tone sequences with two pattern matchers each configured with a tone pattern. A pattern matcher locates a user tone sequence by detecting a sequence of DTMF signals that satisfies a tone pattern. The pattern matcher includes the signals in the tone sequence. A tone pattern is a string that divides all possible sequences of DTMF signals into two categories, those that satisfy the tone pattern and those that do not. The tone pattern is written in a pattern matching language.

B1. Single pattern matching

In one embodiment, the gateway 1 has two pattern matchers, a user request pattern matcher and a user interrupt pattern matcher. The gateway 1 uses these pattern matchers in two different modes of operation, single pattern matching mode and dual pattern matching mode. In single pattern matching mode, the gateway 1 uses only the user request pattern matcher. In one embodiment, the gateway 1 operates in this mode whenever the content client 2B is absent. In this mode, whenever the gateway 1 receives an application dialog step through the browser client 2A, the gateway 1 activates the pattern matcher after configuring it with the tone pattern in the client.

B2. Dual pattern matching

In dual pattern matching mode, the gateway 1 uses both pattern matchers. In one embodiment, the gateway 1 operates in this mode whenever the content client is present. In this mode, whenever the gateway 1 receives an application dialog step through either client, the gateway 1 activates the user request and user interrupt pattern matchers after configuring them with the tone patterns in the content and browser clients 2B and 2A, respectively.

The dual pattern matchers allow the gateway 1 to locate user tone sequences of two kinds simultaneously. Specifically, a user request is a user tone sequence located using the user request pattern matcher. A user interrupt candidate is a user tone sequence located using the user interrupt pattern matcher. The dual pattern matchers are coupled to allow the gateway 1 to determine whether a user request and a user interrupt candidate are "coupled", i.e., whether one sequence of DTMF signals underlies both. Note that in dual pattern matching mode, the user interrupt pattern matcher can remain active even after the user request pattern matcher locates a user request. This technique allows the gateway 1 to locate and respond to a user interrupt candidate while the content application 2B receives or responds to the report of the user request.

B3. Handling of User Interrupts

The gateway 1 locates a user interrupt candidate so that it can determine whether the candidate is a user interrupt. A user interrupt is a user interrupt candidate that the user intends as the first user request in a dialog with the browser 4A (rather than the content application 4B).

In one embodiment, user interrupts are handled somewhat differently for user tone sequences than for user utterances. Every user interrupt candidate represented by a user tone sequence is a user interrupt by definition. The gateway 1 sends each user interrupt (candidate) to the browser 4A by firing the USER_INTERRUPT event. The browser 4A fires an event other than the APP_NOT_INTERRUPT event at the gateway 1 and begins a dialog with the user using the response that reports the event.

In the above embodiment, if the user interrupt is coupled to a user request, the gateway 1 does not send the user request to the content application. Thus a user interrupt preempts a coupled user request.

C. Endpointers

Figure 10A:
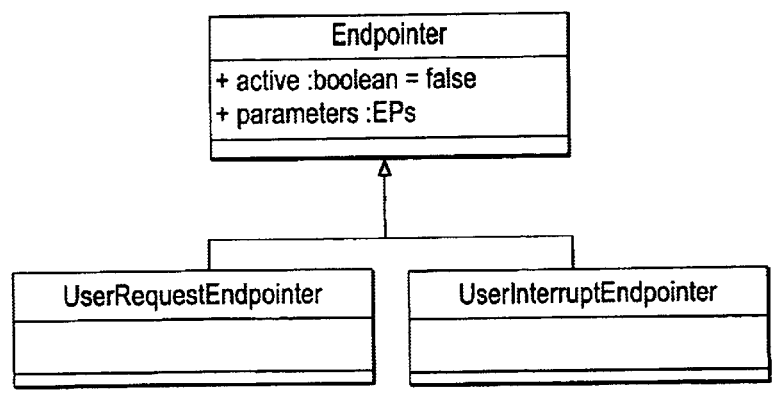
FIG. 10A shows the hierarchy of endpointer types.

A user utterance is located and categorized by an endpointer. In one embodiment, a particular endpointer in the gateway 1 is designed to locate either user requests or user interrupts, but not both. The two endpointers 26 and 27 may be embodied as instances of classes that reflect this difference in scope. Therefore, the Endpointer class may be defined to have the following two subclasses: user request endpointer and user interrupt endpointer C1. The Endpointer Class FIG. 10A shows the hierarchy of endpointer classes. An endpointer locates a user utterance in the audio stream produced by a user's telephone 7. For each utterance to be located, an endpointer is first configured with endpointing parameters (described further below), activated, and then deactivated. When activated, the endpointer locates the next utterance that occurs in the audio stream in accordance with the endpointing parameters, renders the utterance as a sequence of audio samples, and reports the outcome of its activation. The endpointer produces the audio samples as fast as the timing of the utterance and the requirements of the endpointing parameters allow. When deactivated, the endpointer abruptly terminates the endpointing process and reverts to its inactive state.

The Endpointer class defines the following attributes:

active: boolean—whether the endpointer is active. Setting the attribute to true or false activates or deactivates the endpointer, respectively. This attribute defaults to false.

parameters: EPs—the endpointer's endpointing parameters. Setting the attribute configures the endpointer. This attribute is present if and only if the endpointer is configured.

The Endpointer class defines the following association, telephone: Telephone, which represents the user's telephone. This attribute is present if and only if the telephone 7 is connected to the gateway 1.

Note that the rules that govern the timing of audio samples may require the endpointer to buffer audio. The buffering requirement may be more severe for the user interrupt endpointer.

C2. The User Request Endpointer Class

The user request endpointer 26 represents an instance of the user request endpointer class of component. A user request endpointer constrains its inherited parameters attribute so that the setter only consumes and the getter only produces an instance of the UserRequestEPs class. An instance of this class reports the outcome of its activation by firing either the USER_DIALOG_STEP event or the USER_ TOO_EARLY, USER_TOO_LATE, or USER_TOO_LONG event.

C3. The User Interrupt Endpointer class

The user interrupt endpointer 27 represents an instance of the user interrupt endpointer class of component. A user interrupt endpointer constrains its inherited parameters attribute so that the setter only consumes and the getter only produces an instance of the UserInterruptEPs class. An instance of this class reports the outcome of its activation by firing the USER_INTERRUPT event.

D. Endpointing Parameters

Figure 10B:
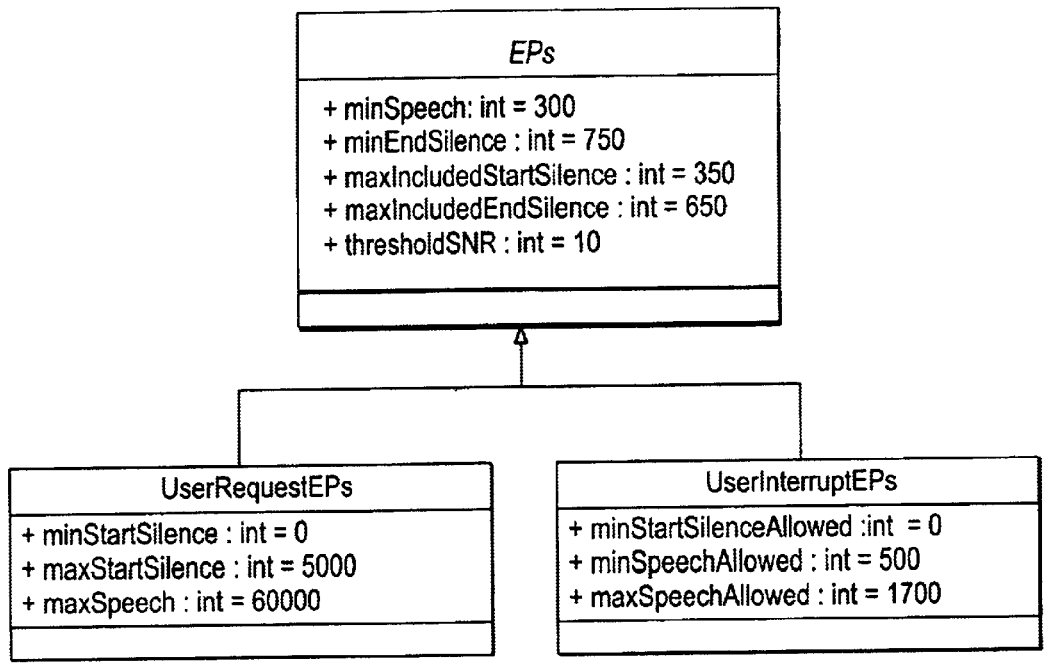
FIG. 10B shows the hierarchy of endpointing parameter types.

An endpointer is configured with endpointing parameters. Endpointing parameters guide an endpointer by constraining the length of the utterance as a whole and the lengths and relative strengths of its periods of speech and silence. In this Voice Web architecture, some endpointing parameters apply to any endpointer, while others apply only to the user request endpointer 26 or only to the user interrupt endpointer 27. The parameters are attributes defined by classes that reflect these differences in applicability. Therefore, the following two endpointing parameter (EP) classes are now defined: user request EPs and user interrupt EPs. FIG. 10B shows the hierarchy of endpointing parameter classes, with some illustrative default values shown.

D1. The EPs Class

The endpointing parameters EPs class defines the following attributes:

minSpeech: integer—the amount of speech (in units of time) that signifies that the utterance has started. The default may be, for example, 300 milliseconds (ms). This parameter requires that the length of speech is greater than or equal to minSpeech. A lesser amount of speech is counted as start silence instead. Thus, an endpointer delays its first audio sample until this parameter is satisfied.

minEndSilence: integer—the amount of silence (in units of time) that signifies that the utterance has ended. The default may be, for example, 750 ms. This parameter requires that the length of end silence is greater than or equal to minEndSilence. A lesser amount of end silence is counted as speech instead. Thus, an endpointer delays its last audio sample until this parameter is satisfied.

maxIncludedStartSilence: integer—the maximum amount of start silence (in units of time) that is included in the utterance. This attribute defaults to, for example, 350 ms. This parameter requires that the length of included start silence equals the smaller of the length of start silence and maxIncludedStartSilence. This requirement may be satisfied by fiat.

maxIncludedEndSilence: integer—the maximum amount of end silence (in units of time) that is included in the utterance. The default may be, for example, 650 ms. This parameter requires that the length of included end silence equals the smaller of the length of end silence and maxIncludedEndSilence. This requirement may also be satisfied by fiat.

thresholdSNR: integer—the minimum amount by which the signal strength of the speech exceeds that of the start and end silence. The default may be, for example, 10 dB. This parameter requires both that:

$20 \log_{10}(S(speech)/S(start\ silence)) \geq thresholdSNR$ and that $20 \log_{10}(S(speech)/S(end\ silence)) \geq thresholdSNR$, where the notation "S(A)" represents "the signal strength of A". Less pronounced speech is counted as start silence or end silence, respectively, instead.

D2. The User Request EPs class

A set of user request endpointing parameters guides a user request endpointer. The user request EPs class defines the following attributes (which are in addition to those described above in subsection "D1."):

minStartSilence: integer—the minimum amount of start silence (in units of time). The default may be, for example, 0 ms. This parameter requires that the length of start silence is greater than or equal to minStartSilence. A lesser amount of start silence is an exceptional condition.

maxStartSilence: integer—the maximum amount of start silence (in units of time). A value of zero implies infinity for this parameter. The default may be, for example, 5,000 ms. This parameter requires that the length of start silence is less than or equal to maxStartSilence. A greater amount of start silence is an exceptional condition.

maxSpeech: integer—the maximum amount of speech (in units of time). A value of zero implies infinity for this parameter. The default may be, for example, 60,000 ms. This parameter requires that the length of speech is less than or equal to maxSpeech. A greater amount of speech is an exceptional condition.

D3. The User Interrupt EPs Class

A set of user interrupt endpointing parameters guides a user interrupt endpointer. This class defines the following attributes (which are in addition to those described above in subsection "D1."):

minStartSilenceAllowed: integer—the minimum amount of start silence (in units of time), which may default to 0 ms, for example. This parameter requires that the length of start silence is greater than or equal to minStartSilenceAllowed. A lesser amount of start silence causes the end silence to be counted as start silence for the next utterance.

minSpeechAllowed: integer—the minimum amount of speech (in units of time), which may default to 500 ms, for example. This parameter requires that the length of speech is greater than or equal to minSpeechAllowed. A lesser amount of speech causes the end silence to be counted as start silence for the next utterance. Thus, an endpointer delays its first audio sample until this parameter is satisfied.

maxSpeechAllowed: integer—the maximum amount of speech (in units of time), which may default to 1,700 ms, for example. This parameter requires that the length of speech is less than or equal to maxSpeechAllowed. A greater amount of speech causes the end silence to be counted as start silence for the next utterance. Thus, an endpointer delays its first audio sample until this parameter is satisfied.

E. Voice Classes

Figure 10C:
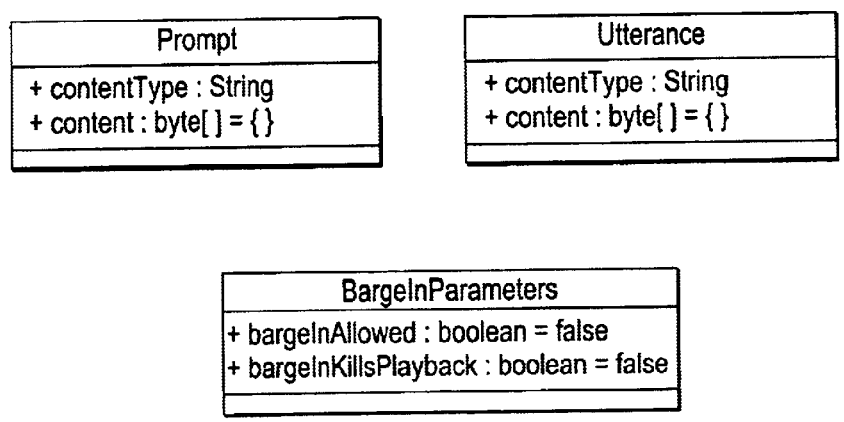
FIG. 10C shows the hierarchy of voice types.

An application's voice user interface (VUI) includes application prompts, user utterances, and user tone sequences. Application prompts and user utterances can be represented by instances of classes, as are the sets of parameters that determine how the two interact. The following voice classes, therefore, may be defined: Prompt, Utterance, BargeInParameters. FIG. 10C shows the hierarchy of voice classes.

E1. The Prompt Class

A prompt represents an application prompt as audio. A prompt whose attributes have their default values represents an application prompt of zero duration. The Prompt class defines the following attributes:

contentType: String—the content attribute's encoding regime.

content: byte[ ]—the zero or more bytes that encode the prompt, which may default to none. To achieve the effect of sending a text prompt, rather than an audio prompt, the sender first converts the text to speech. To achieve the effect of sending a succession of prompts, rather than a single prompt, the server first concatenates them.

E2. The Utterance Class

An utterance represents a user utterance as audio. An utterance whose attributes have their default values represents a user utterance of zero duration. The Utterance class defines the following attributes:

contentType: String—the content attribute's encoding regime.

content: byte[ ]—the zero or more bytes that encode the utterance, which may default to none.

E3. The Barge-in Parameters Class

A set of barge-in parameters guides the transition from one application prompt to the next user utterance or user tone sequence. These parameters allow the user to barge in (speak while a prompt is being played) if and only if they allow the utterance or tone sequence to have effect even if the prompt is still being played. This class defines the following attributes:

bargeInAllowed: boolean—whether the user utterance or tone sequence can barge in on the application prompt. A value of true signifies that the utterance or tone sequence has effect even if the prompt is being played. A value of false signifies that utterance or tone sequence is ignored. This parameter may default to a value of false.

bargeInKillsPlayback: boolean—whether barge-in, if allowed, interrupts the application prompt. A value of true signifies that the prompt is terminated abruptly. The default value may be false, which signifies that the prompt is completed.

VI. Voice Web Protocol

A client 2 and a server 3 exchange messages following the Voice Web protocol. The Voice Web protocol is an application-level protocol, which in one embodiment is layered on top of HTTP Version 1.1 ("HTTP/1/1", specified in "Hypertext Transfer Protocol—HTTP/1.1", Network Working Group RFC 2616, June 1999). HTTP/1.1 is advantageous due to its persistent connections and chunked transfer-coding. Thus, the Voice Web protocol can be specified by mapping features of the Voice Web architecture onto features of HTTP/1.1, as follows: A Voice Web client 2 may be realized as an HTTP user agent. A Voice Web server 3 may be realized as an HTTP origin server. A Voice Web application 4 may be realized as an HTTP resource.

The messages with which voice web components communicate can be realized as shown in Table 1.

TABLE 1

| Voice web element | HTTP realization |
| --- | --- |
| message | message |
| request | POST request |
| response | response |
| URI | URI |
| cookie | cookie |

A voice web request can be realized as shown in Table 2, which considers a request attribute by attribute.

TABLE 2

| Attribute | HTTP realization |
| --- | --- |
| applicationURI | The Request-URI in the Request-Line. |
| applicationCookies | The values of the Cookie request header fields. |

TABLE 2-continued

| Attribute | HTTP realization |
| --- | --- |
| userEvent | A header field in the trailer of the chunked body. Note: The attribute's placement in the trailer lets the sender follow the rules the handling of user interrupts (described above). |
| userUtterance | The second part of a two-part entity body. This part's media type is "audio". |
| request pack | The first part of a two-part entity body. This part's media type is "application". |

The request pack noted in Table 2 includes the request attributes that the table does not mention. For this purpose the request's class is considered an attribute and is thus included in the pack. The request pack can be realized as an Extensible Mark-up Language (XML) document. Note that sending the request pack ahead of the user utterance (if any) gives the receiver as much information about the request as possible before the utterance occupies the connection.

The entity body of the HTTP POST request may take one of two forms. If a user utterance is present, the body has two parts as shown in Table 2 and the user utterance is realized by one of them. Otherwise, the request pack is the entire body.

The HTTP POST request employs the chunked transfer-coding. The chunked transfer-coding allows the user utterance to be sent while the user is speaking (and, thus, before the extent of the utterance is known). This technique relieves the sender of the need to buffer the utterance and lets the receiver recognize the utterance in parallel with its transmission.

A voice web response can be realized as shown in Table 3, which considers a response attribute by attribute.

TABLE 3

| Attribute | HTTP realization |
| --- | --- |
| applicationURI | The value of the Location response header field. |
| applicationCookies | The values of the Set-Cookie2 response header fields. |
| applicationException | The Status-Code in the Status-Line. |
| applicationPrompt | The second part of a two-part entity body. This part's media type is "audio". |
| response pack | The first part of a two-part entity body. This part's media type is "application". |

The response pack includes the response attributes that the table does not mention. For this purpose, the response's class is considered an attribute and thus included in the pack. The response pack can be realized as an XML document. Note that sending the response pack ahead of the application prompt (if any) gives the receiver as much information about the response as possible before the prompt occupies the connection. The endpointing and barge-in parameters are particularly important in this context.

The entity body of the HTTP response can take one of two forms. If an application prompt is present, the body has two parts as shown in Table 3, and the application prompt is realized by one of them. Otherwise, the response pack is the entire body.

VII. Gateway Processes

Figure 11:
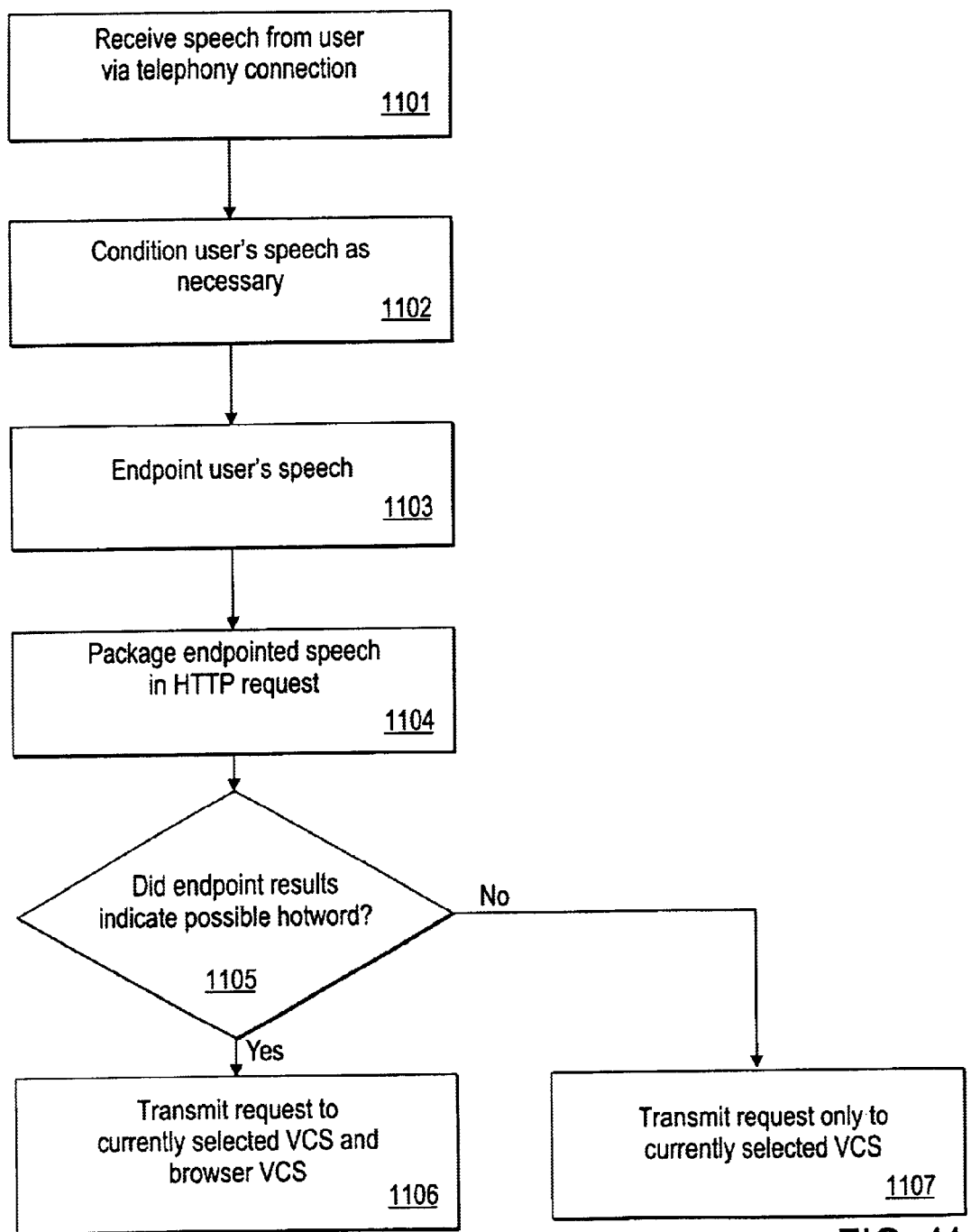
FIG. 11 is a flow diagram showing a gateway process for transmitting a user's speech to a content site.
Figure 12:
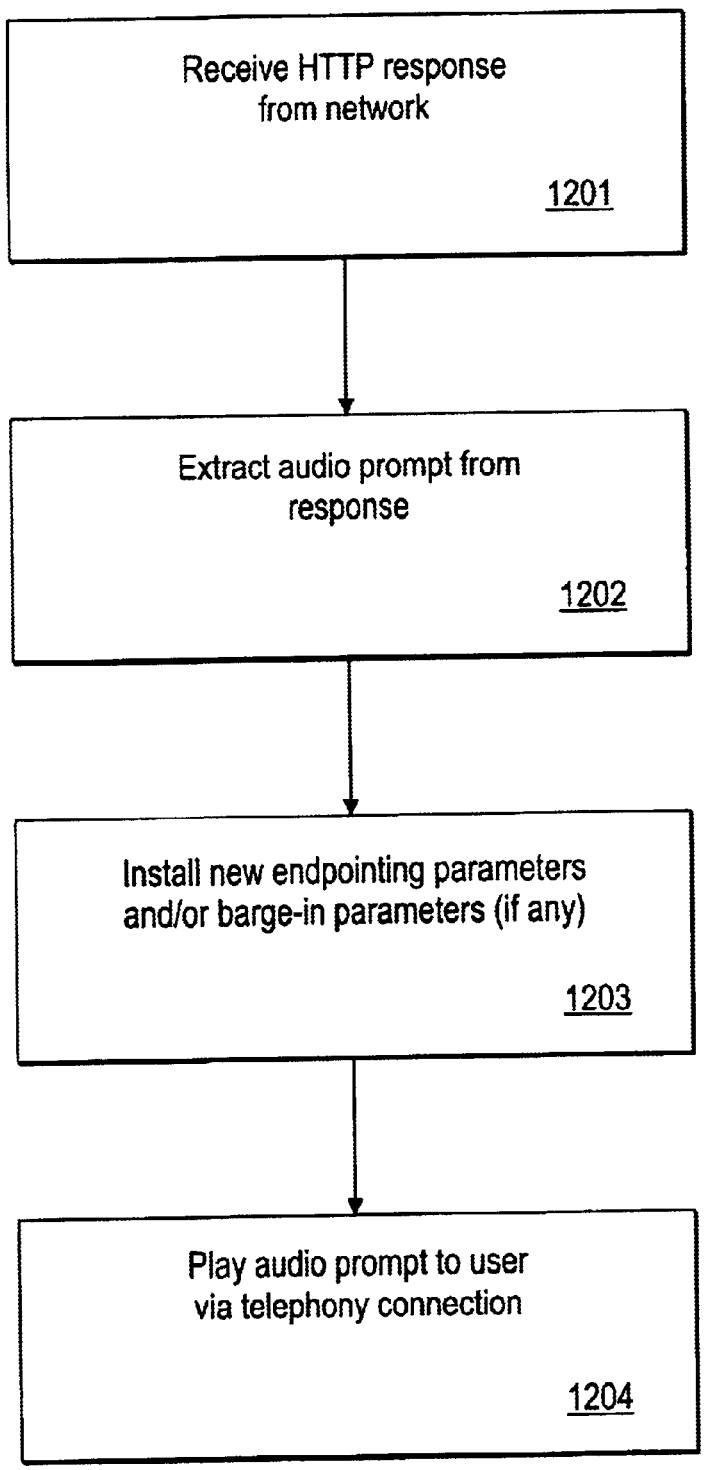
FIG. 12 is a flow diagram showing a gateway process for handling audio prompts.
Figure 13:
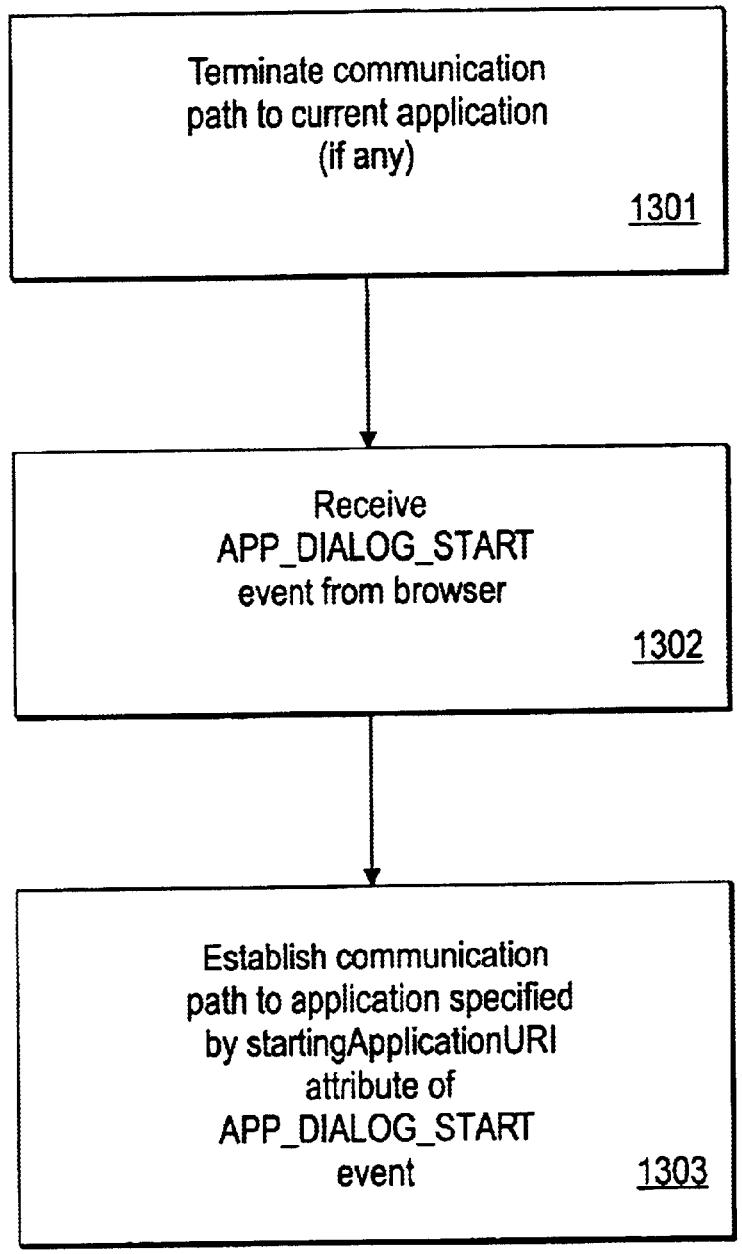
FIG. 13 is a flow diagram illustrating a gateway process for accessing a Voice Web site in response to messages from the browser.

FIGS. 11 through 13 illustrate three major processes performed by a gateway 1. Referring first to FIG. 11, an embodiment of a gateway process for providing a user's speech to a VCS is illustrated. Reference is also again made to FIGS. 1 and 2. Initially, at 1101, the gateway 1 receives speech from a user via its telephony connection. At 1102, the gateway 1 conditions the user's speech as necessary, which may include providing echo cancellation, buffering the speech and/or other operations. At 1103, the gateway 1 endpoints the user's speech. The gateway 1 packages the endpointed speech in an HTTP request at 1104. Each utterance may be packaged within a single HTTP request. Next, if the endpointing operation resulted in a hotword indication at 1105 (based on applying the user interrupt endpointing parameters), then at 1106 the request is transmitted to both the VCS 5A of the browser 4A and the currently selected VCS 5B. (It is assumed that the currently selected VCS is not that of the browser 4A in this example.) Otherwise, the request is transmitted only to the currently selected VCS 5B at 1107.

FIG. 12 shows an embodiment of a gateway process for handling prompts. At 1201, the gateway 1 receives an HTTP response containing an audio prompt from an application 4. At 1202, the gateway 1 extracts the audio prompt from the response, and at 1203, the gateway 1 installs any new endpointing parameters and/or barge-in parameters provided by the application 4, for use beginning with the next utterance by the user. At 1204, the gateway 1 plays the audio prompt to the user via its telephony connection. The gateway 1 may buffer the prompt after receiving it from the application 4 and prior to playing it. This buffering may be used to adjust for network congestion.

FIG. 13 shows an embodiment of a gateway process for voice linking to a VCS in response to the browser 4A. This process may be performed in the gateway 1, for example, in response to the browser 4A having received a "go forward" or "go backward" command or the name of a bookmark from the user. At 1301, the gateway 1 terminates its association to a current application 4 (if any), which may result from an APP_DIALOG_FINISH event. At 1302, the gateway 1 receives an APP_DIALOG_START event from the browser 4A. At 1303, the gateway 1 establishes an association to the application specified by the startingApplicationURI attribute of the detected APP_DIALOG_START event.

VIII. Incoming Call Scenarios

A user accesses the Voice Web by placing a telephone call to a gateway 1. The following is a description of a number of scenarios that commonly surround such an incoming call, with reference to the timing (UML sequence) diagrams of FIGS. 14 through 25. In each of FIGS. 14 through 25, the sequence of messages is represented chronologically proceeding down the page. Note that the Voice Web may also be used for other purposes, such as placing outgoing calls through the browser 4A, setting up conference calls, etc. However, a detailed description of such other purposes is not necessary for an understanding of the present invention and is therefore not provided herein. Nonetheless, it may be noted that to place an outgoing call, a voice hyperlink's URI, e.g., Uniform Resource Locator (URL), or other identifier, may designate a telephone number, in which case the outgoing call may be placed using conventional methods.

A number of standard telephony signals are referred to in FIGS. 14 through 25. These signals are referred to as Setup, Call Proceeding, Alerting, Connect, Disconnect, Connect Ack (Acknowledge), Release, and Release Complete. These signals are well known in the field of telephony, and their functions will be readily appreciated from their names (notwithstanding that they may be given other names in some applications) and the context in which they are mentioned below.

Figure 14:
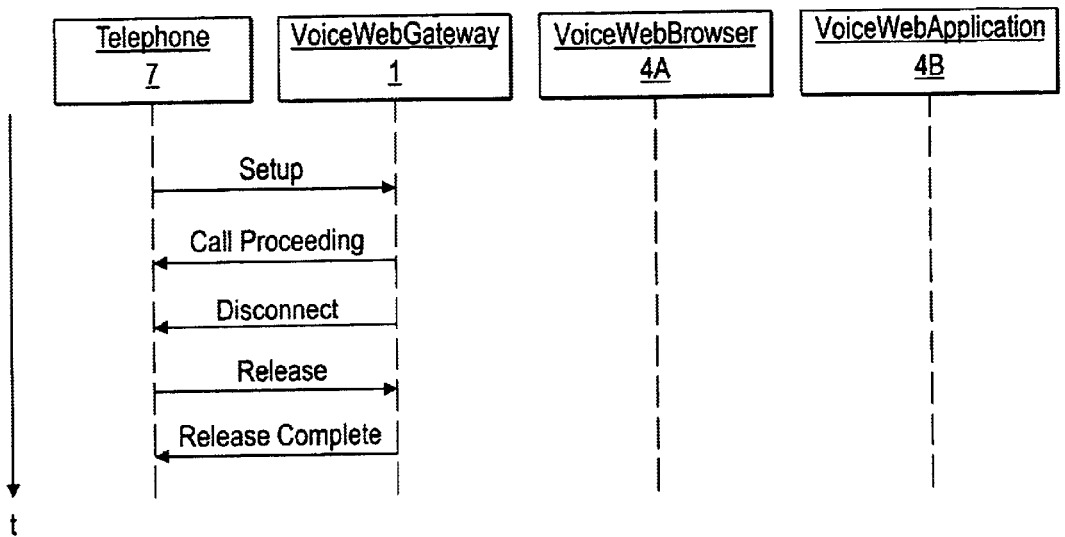

FIG. 14 illustrates the rejection of an incoming telephone call by the gateway 1. The initial state is that the call is not connected. A Setup message (i.e., a notice of incoming call) is initially transmitted from the user telephone 7 to the gateway 1. In response, the gateway 1 sends a Call Proceeding message to the telephone 7. The gateway 1 then sends a Disconnect message to telephone 7, which responds with a Release message. The gateway 1 then sends a Release Complete message to the telephone 7. The final state is that the call is not connected.

Figure 15:
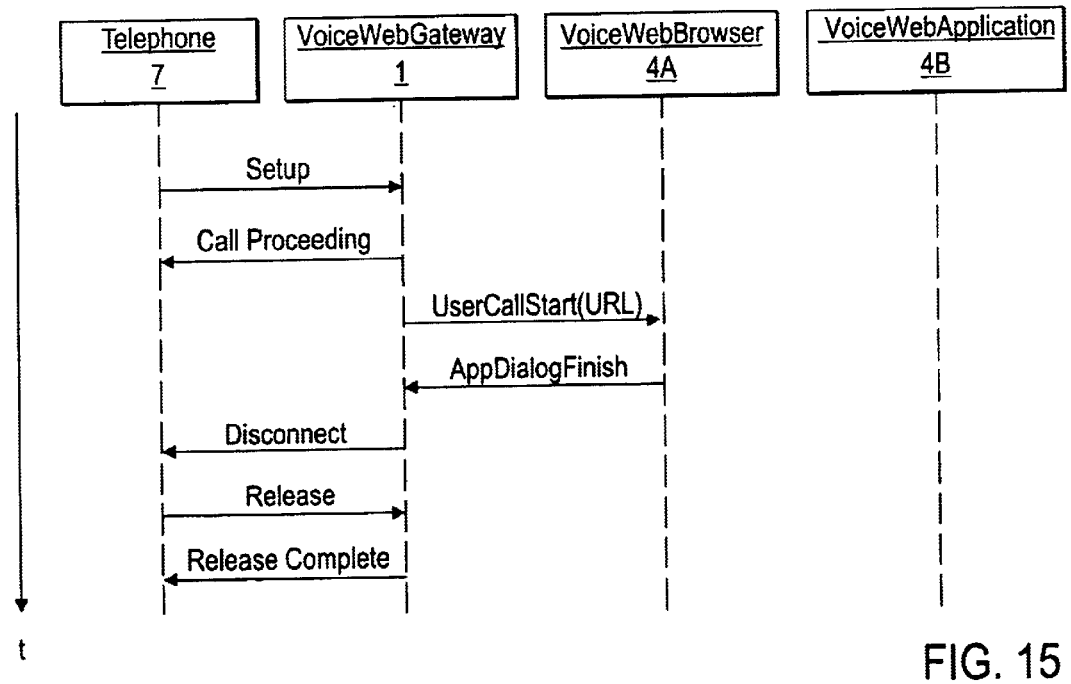

FIG. 15 shows the scenario of the rejection of an incoming telephone call by the browser 4A. The initial state is that the call is not connected. The scenario of FIG. 15 is similar to that of FIG. 14, except that, in response to the Setup signal, the gateway 1 transmits a UserCallStart request to the browser 4A, which responds with the AppDialogFinish response. The Disconnect message is sent by the gateway 1 in response to receiving the AppDialogFinish response. The final state is that the call is not connected.

Figure 16:
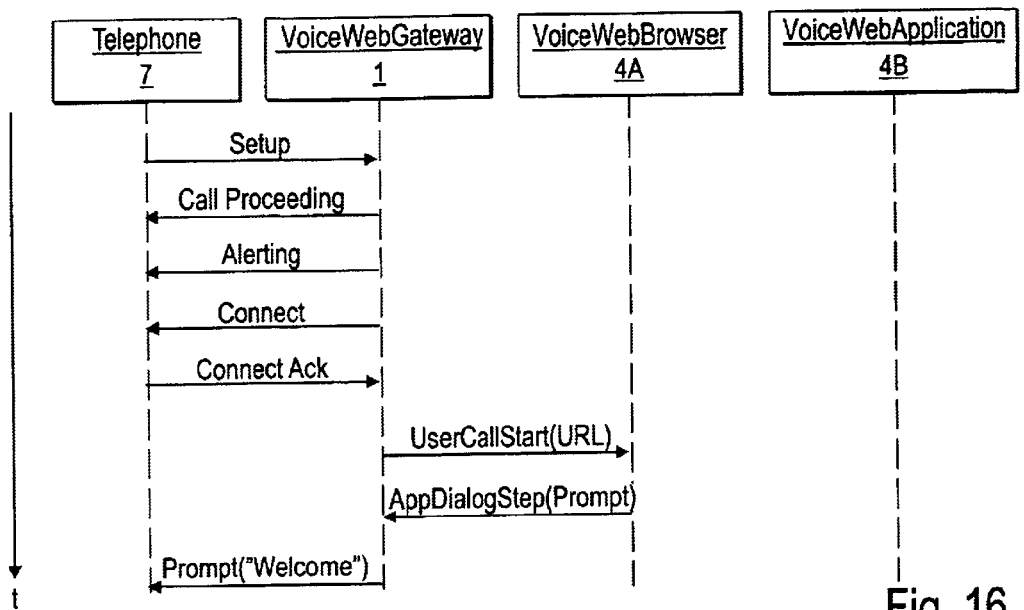

FIG. 16 shows the acceptance of an incoming telephone call by the gateway 1. The initial state is that the call is not connected. After sending the Call Proceeding message, the gateway 1 sends an Alerting (ringing) message to the telephone 7. A Connect message then is sent by the gateway 1 to the telephone 7, which produces a Connect Ack message from the telephone 7. In response to the Connect Ack message, the gateway 1 sends the UserCallStart request to the browser 4A, which responds with an AppDialogStep response containing a prompt, such as "Welcome". The gateway 1 then plays the prompt to the user. The final state is that the call is connected, the user and the browser 4A are engaged in a dialog, and a user request is awaited.

Figure 17:
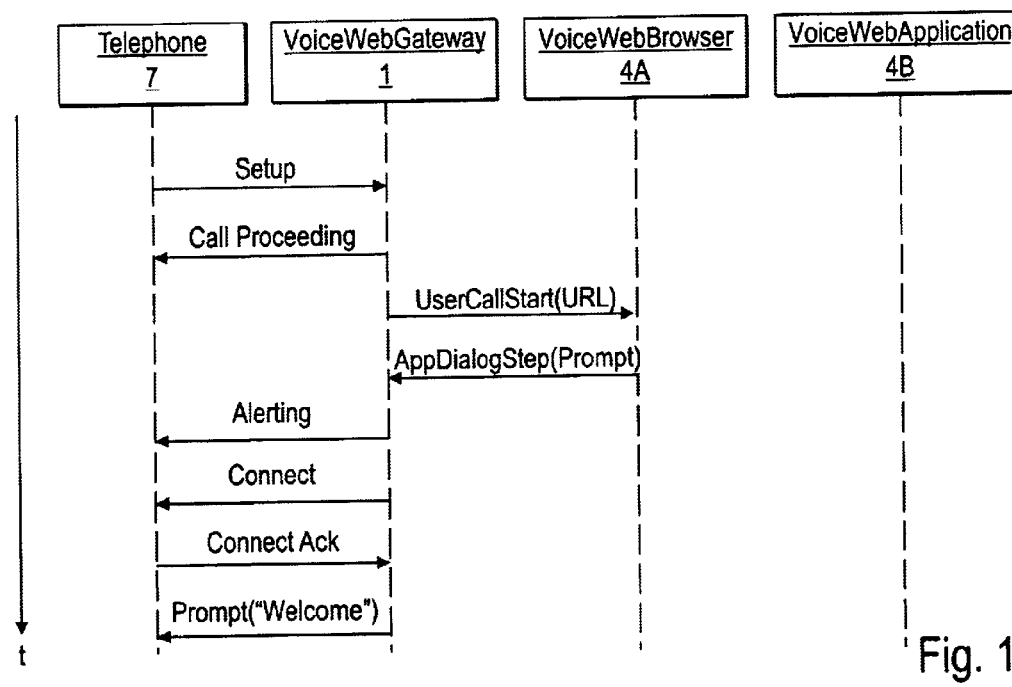

FIG. 17 shows the acceptance of an incoming telephone call by the browser 4A. The initial state is that the call is not connected. The sequence is similar to that in FIG. 16, except that the gateway 1 does not send the Alerting message to the telephone 7 until it has received the AppDialogStep message with prompt from the browser 4A. The final state is that the call is connected, the user and the browser 4A are engaged in the dialog, and a user request is awaited.

Figure 18:
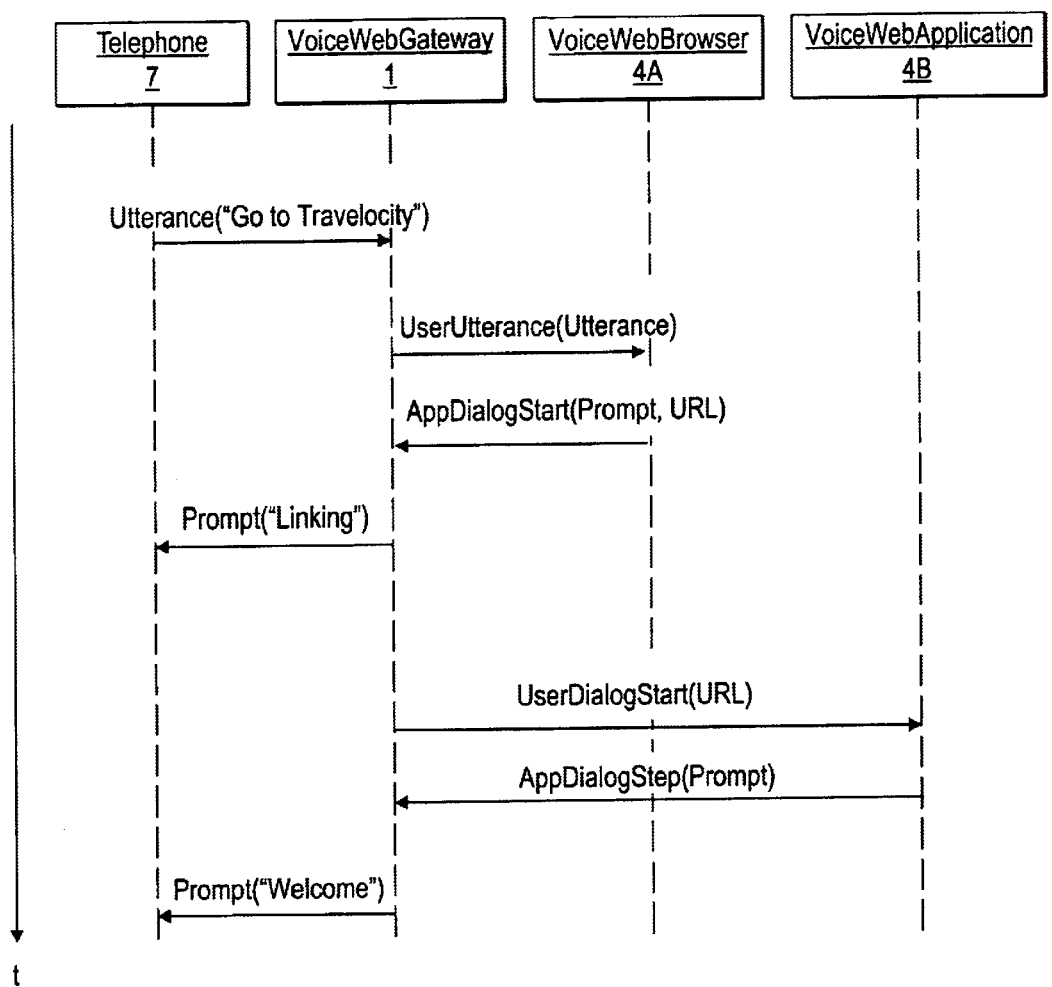

FIG. 18 illustrates the successful transfer of a user from the browser 4A to another application 4 at the user's request. The initial state is that the user and the browser 4A are engaged in a dialog, and a user request is awaited. An utterance (e.g., "Go to Travelocity") is received by the gateway 1 and passed on as endpointed speech in a UserUtterance request to the browser 4A. The browser 4A responds with an AppDialogStart response that includes a prompt (e.g., "Linking") and a URI. The gateway 1 then plays the prompt to the user and sends a UserDialogStart request to the specified application 4 using the provided URI. The application 4 responds with an AppDialogStep response and a prompt (e.g., "Welcome"). The gateway 1 then plays the prompt to the user. The final state is that the user and the other application 4 are engaged in a dialog, and a user request is awaited.

Figure 19:
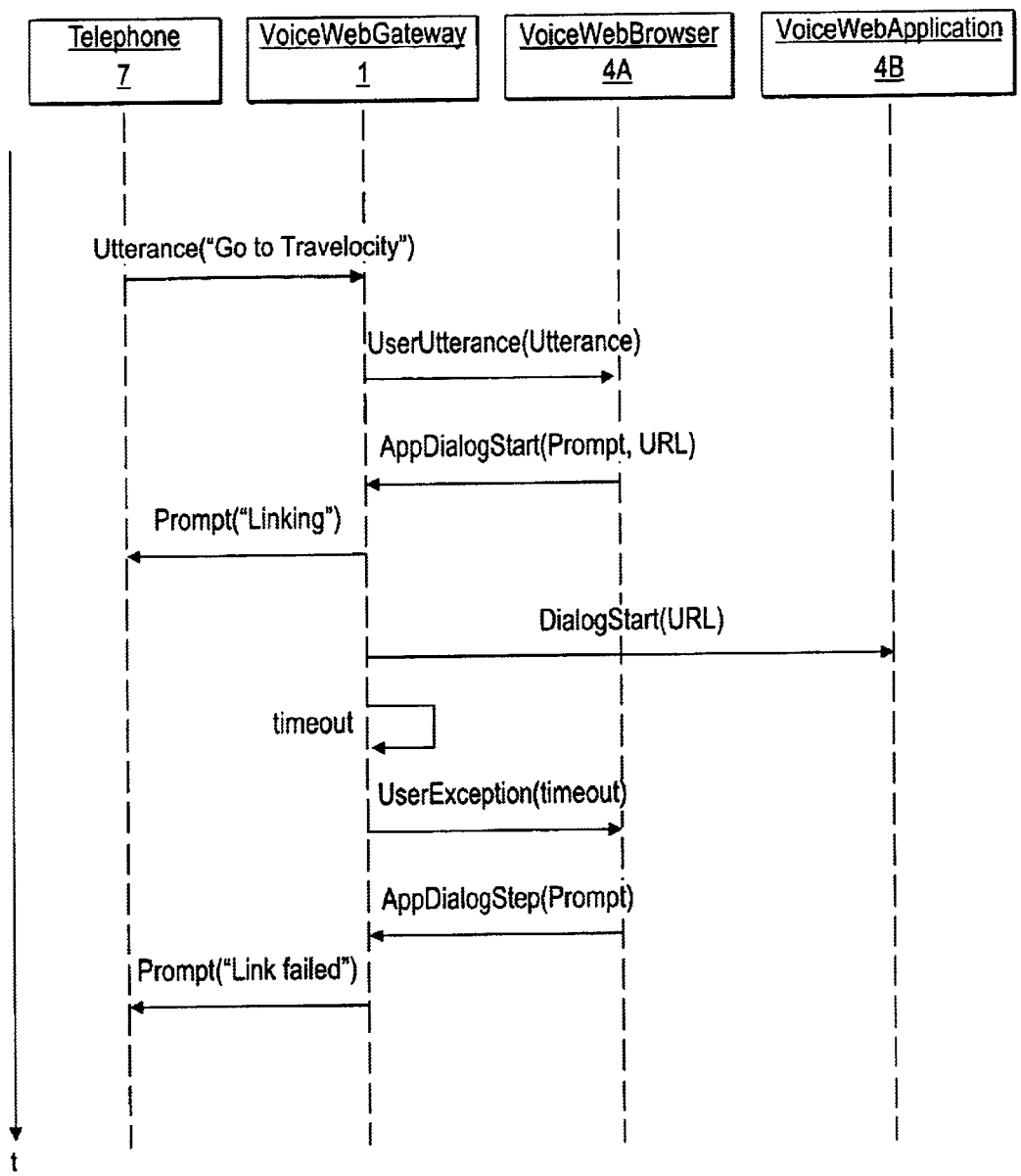

FIG. 19 shows the unsuccessful transfer of the user from the browser 4A to another application 4 in response to the user's request, due to the failure of the application 4A to respond in a timely manner. The initial state is that the user and the browser 4A are engaged in a dialog, and a user request is awaited. The sequence is the same as that of FIG. 18, through the sending of the UserDialogStart message to the application 4 by the gateway 1. At that point, however, no response is received from the application 4B within the timeout. The gateway 1 therefore sends a UserException request to the browser 4A indicating that the timeout has occurred. The browser 4A responds with an AppDialogStep message containing an appropriate prompt, such as "Link Failed", which is played to the user by the gateway 1. The final state is that the user and the browser 4A are engaged in a dialog, and a user request is awaited.

Figure 20:
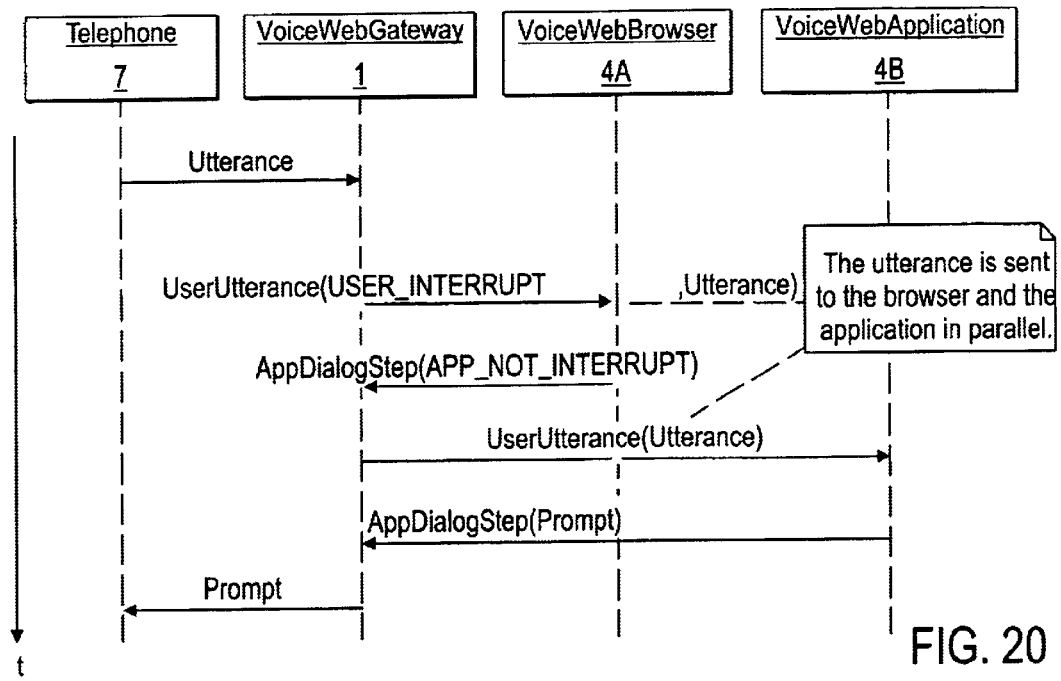

FIG. 20 illustrates the scenario in which the user utters speech resembling the hotword, but the utterance is ultimately deemed not to be the hotword. The initial state is that the user and an application 4B other than the browser 4A are engaged in a dialog, and a user request is awaited. When the hotword endpointing parameters are determined by the gateway 1 to correspond to the hotword, the gateway 1 sends the endpointed utterance to both the browser 4A and the current application 4B in parallel. The request sent to the browser 4A indicates the event, USER_INTERRUPT. When the speech recognizer associated with the browser 4A determines that the speech is not the hotword, the browser 4A transmits an AppDialogStep response indicating the event, APP_NOT_INTERRUPT, to the gateway 1. The application 4B responds by transmitting an AppDialogStep response with an appropriate prompt to the gateway 1,which then plays the prompt to the user. The final state is that the user and the application other than the browser 4A are engaged in a dialog, and a user request is awaited.

Figure 21:
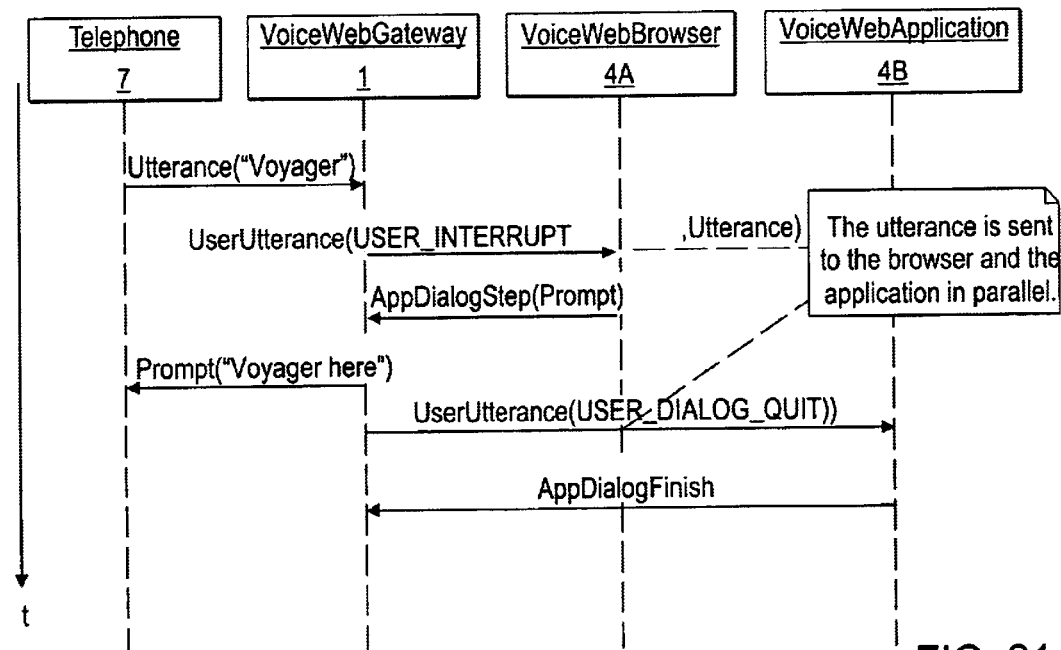

FIG. 21 shows the scenario in which the user utters the hotword. The initial state is that the user and an application other than the browser 4A are engaged in a dialog, and a user request is awaited. The sequence is essentially the same as that in FIG. 20, except that the browser 4A responds to the UserUtterance message with an AppDialogStep response with an appropriate prompt signaling that the browser 4A has been engaged. The prompt is played by the gateway 1 to the user, and the gateway 1 issues a UserUtterance message indicating the USER_DIALOG_QUIT event to the application 4B. The application 4B responds with the AppDialogFinish message to the gateway 1. The final state is that the user and browser 4A are engaged in a dialog and a user request is awaited.

FIG. 22 shows the successful transfer of the user from one application 4B1 to another 4B2 using a voice hyperlink. The initial state is that the user and the first application 4B1 are engaged in a dialog and a user request is awaited. The user utters a voice hyperlink designating the second application 4B2 (e.g., "Hertz"). The gateway 1 provides the utterance to the first application 4B1, which responds with an AppDialogLink message containing the URI of the second application and an appropriate prompt (e.g., "Goodbye"). The gateway 1 then sends a UserDialogLink with the specified URI to the browser 4A, which responds with an AppDialogStart message and an appropriate prompt (e.g., "Linking"). In response, the gateway 1 sends a UserDialogStart message to the new application 4B1, which responds with an AppDialogStep message containing an appropriate prompt (e.g., "Welcome"). The gateway 1 then plays the prompt to the user. The final state is that the user and the second application are engaged in a dialog and a user request is awaited.

FIG. 23 shows the unsuccessful transfer of the user from one application to another using a voice hyperlink. The initial state is that the user and the first application are engaged in a dialog and a user request is awaited. The sequence is essentially the same as that of FIG. 22 through the sending of the UserDialogLink message to the browser 4A. At this point, the browser 4A responds with an AppDialogStep message containing a prompt (e.g., "Sorry") indicating that the link was unsuccessful. The gateway 1 then plays the prompt to the user. The final state is that the user and the browser 4A are engaged a dialog and a user request is awaited.

Figure 24:
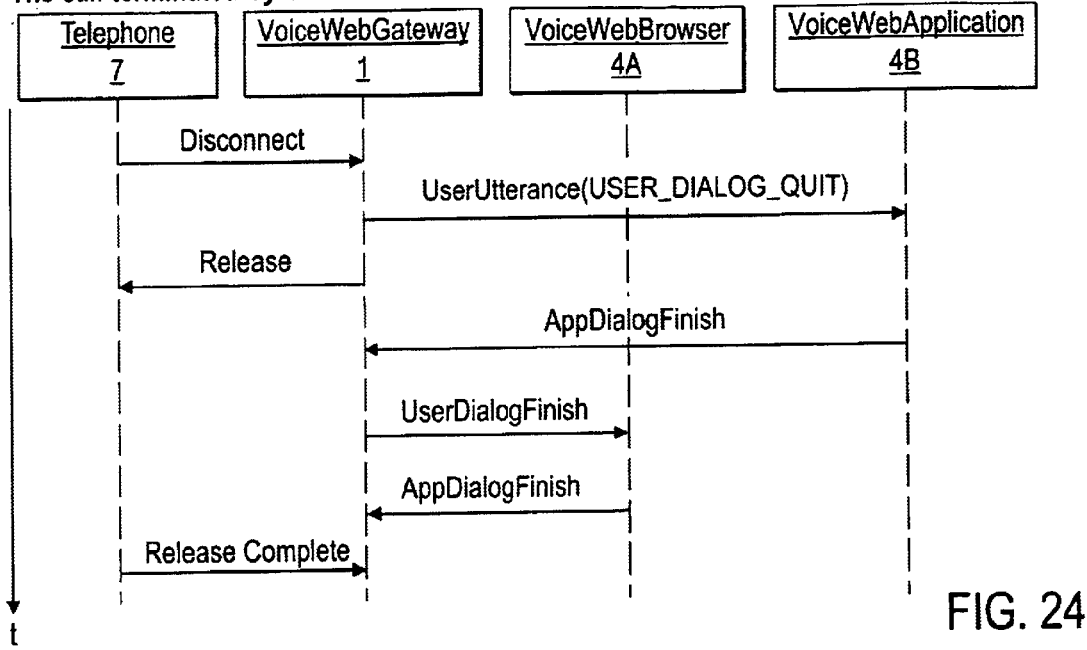

FIG. 24 illustrates the termination of an incoming call by the caller. The initial state is that the call is connected. When the caller hangs up, the telephone 7 sends a Disconnect signal to the gateway 1. The gateway 1 then issues a UserUtterance message indicating the USER_DIALOG_QUIT event to the current application4B and sends a Release signal to telephone 7. The application 4B responds to gateway 1 with an AppDialogFinish message. The gateway 1 then transmits a UserDialogFinish message to the browser 4A, which responds to the gateway 1 with an AppDialogFinish message. The telephone 7 responds to the Release signal with a Release Complete signal. The final state is that the call is not connected.

Figure 25:
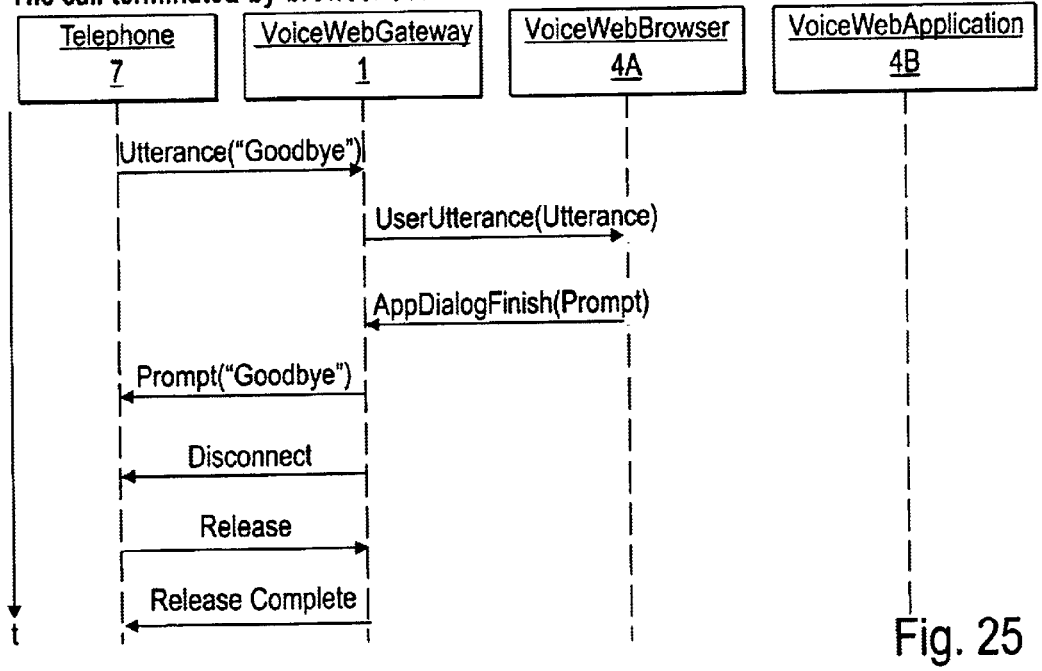

FIG. 25 shows the termination of an incoming call by the browser 4A at the user's request. The initial state is that the user and the browser 4A are engaged in a dialog and a user request is awaited. The user utters a keyword (e.g., "Goodbye"), which is provided by the gateway 1 to the browser 4A. The browser 4A responds with an AppDialogFinish message containing an appropriate prompt confirming termination of the session, which the gateway 1 plays to the user. The Disconnect, Release, and Release Complete signals are then exchanged as in the scenario of FIG. 24. The final state is that the call is not connected.

IX. Advantages of the Distributed Voice Web Architecture

The above-described distribution of Voice Web components and functionality has numerous advantages. To fully appreciate these advantages, it is useful to contrast this distributed Voice Web with an alternative Voice Web architecture that is not distributed. In such an architecture the functions of a gateway, a browser, and a server might be combined in a single machine. In this more centralized architecture, a Voice Service Provider (VSP) operates this machine. Each content site hosts (i.e., stores) its own Voice User Interface (VUI) on a standard Web server. The VSP downloads the VUI from the Web server, executes Voice eXtensible Markup Language (VoiceXML) scripts and other associated code for controlling the dialog, and does speech recognition and text-to-speech (TTS) conversion. (VoiceXML is an extensible markup language designed for creating audio dialogs so as to bring the benefits of web-based development and content delivery to interactive voice response applications. See "Voice eXtensible Markup Language, VoiceXML," VoiceXML Forum, Mar. 7, 2000.)

A. Technical Advantages

The distributed architecture has several technical advantages over the non-distributed architecture in terms of denial-of-service attacks, protecting backend service resources, minimizing service delays, and allowing monitoring of service usage.

A1. Preventing Ddenial-of-Service

The centralized architecture tends to be subject to a denial-of-service attack, while the distributed architecture is not. A VSP may be called upon to execute VoiceXML and Java code over which it has no control. Code that computes prime numbers, for example, rather than conducting a voice dialog with a subscriber, may consume VSP resources to the detriment of other subscribers. By contrast, in the distributed architecture, each VCS executes its own code.

A2. Protecting Backend Service Resources

The centralized architecture tends to require that a content site give the VSP access to the backend resources (e.g., databases) upon which the site's VUI relies. That is because the vsp must use those resources to give effect to the VUI (e.g., to execute its VoiceXML SUBMIT elements). For practical reasons, granting the vsp access to backend resources may require making the resources public. In the distributed architecture, however, a VCS's backend resources are protected by confining the VUI to the site.

A3. Minimizing Service Delays

The centralized architecture is subject to the delay involved in downloading the VUIs of content sites and initializing its dialog execution and speech recognition resources to process them. For a large dynamic grammar, for example, the latency can be substantial. In the distributed architecture, however, each VCS concentrates on its own VUI. No downloading is required, and resources are initialized in advance (e.g., at start-up).

A4. Allowing Monitoring of Service Usage

The centralized architecture gives the operator of a content site little or no visibility into its VUI's use. The site cannot maintain audio logs or recognition accuracy statistics, because recognition occurs at the vsp and the audio does not reach the site. By contrast, in the distributed architecture, VCSs do their own recognition and maintain logs as they wish.

Other advantages of the above-described architecture can be achieved, using a conventional Web access protocol (e.g., HTTP). For example, caching servers can be used to improve latency. In addition, secure connections can be used to ensure privacy between a gateway and a VCS.

B. Commercial Considerations

The distributed architecture also has several commercial advantages over the non-distributed architecture in terms of the cost of voice service provision, choice among voice technologies, and protection of research and development (R&D) investment in VUIs.

B1. Distributing the Cost of Voice Service Provision

The centralized architecture concentrates the cost of dialog execution and speech recognition resources at the vsp. The VSP recovers the cost through subscriber fees or advertising revenue. In contrast, the distributed architecture distributes the cost among VCSs. A VCS operator recovers the cost through subscriber fees, advertising revenue, commercial transactions, or, intangibly, improved customer satisfaction.

B2. Distributing the Choice Among Voice Technologies

The centralized architecture places the choice of speech recognition and technology in the hands of vsp operators. The distributed architecture, however, allows operators of individual VCSs to choose. The operator of a VCS offering services for a fee, for example, can choose a particular TTS technology as a product design decision. Note that this freedom of choice may also create a larger market for technology suppliers.

B3. Protecting R&D Investments in VUIs

The centralized architecture may expose to public view certain proprietary technology represented by a content site's VUI, such as scripts, grammars, and prompts. That is because the VSP must download the VUI to execute it. For a large site, especially one offering services for a fee, that IP may represent an investment of tens of person-years or more. In the distributed architecture, however, a VCS's proprietary technology is protected by confining the VUI to the site.

Thus, a distributed voice web architecture that provides a user with access to any of multiple voice content sites on a distributed network has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   receiving speech of a user;
   endpointing the speech of the user locally for automatic speech recognition;
   transmitting the endpointed speech of the user to a remote site over a wide area network for remote speech recognition;
   receiving remotely generated prompts transmitted over the wide area network; and
   playing the prompts to the user.

2. A method as recited in claim 1, wherein the remote site is a remote voice content site, the method further comprising activating a voice hyperlink to provide the user with voice access to the remote site over the wide area network.

3. A method as recited in claim 2, further comprising receiving a first voice hyperlink control message from a remote speech application, wherein said activating the voice hyperlink comprises responding to the voice hyperlink control message to provide the user with access to the remote voice content site.

4. A method as recited in claim 3, wherein the remote speech application is in a remote voice content site other than said remote voice content site.

5. A method as recited in claim 3, wherein the remote speech application is a voice browser.

6. A method as recited in claim 3, wherein the remote speech application is a content application.

7. A method as recited in claim 1, further comprising:
   receiving a first voice hyperlink control message from a remote speech application; and
   transmitting a second voice hyperlink control message to a remote voice browser in response to the first voice hyperlink control message.

8. A method as recited in claim 1, further comprising receiving and responding to a control message from a remote voice browser sent, the control message sent via a second network separate from the wide area network.

9. A method as recited in claim 1, wherein said endpointing comprises concurrently applying, to the speech of the user, a set of endpointing parameters for a voice browser and a set of endpointing parameters for a speech application other than the voice browser.

10. A method as recited in claim 9, further comprising transmitting the endpointed speech to the voice browser if the speech of the user satisfies the set of endpointing parameters for the voice browser.

11. A method as recited in claim 10, wherein the set of endpointing parameters for the voice browser corresponds to a browser hotword.

12. A method as recited in claim 11, further comprising transmitting the endpointed speech to said speech application other than the voice browser even if the speech of the user satisfies the set of endpointing parameters for the browser hotword.

13. A method as recited in claim 1, further comprising locally recognizing a browser hotword in the speech of the user.

14. A method as recited in claim 1, wherein said endpointing comprises:
using a set of endpointing parameters; and
dynamically adjusting the endpointing parameters during a session with the user based on a response received from the remote site.

15. A method as recited in claim 14, wherein the endpointing parameters are modifiable on a per-utterance basis.

16. A method as recited in claim 1, performed concurrently for each of a plurality of users, to allow each of the users to sequentially access selected ones of a plurality of remote sites on the wide area network.

17. A method as recited in claim 1, performed locally within a telephony end user device.

18. A method as recited in claim 1, wherein said receiving speech of the user comprises receiving the speech of the user over the wide area network.

19. A method as recited in claim 1, wherein said receiving speech of the user comprises receiving the speech of the user using Internet Protocol (IP) telephony.

20. A method as recited in claim 1, wherein said receiving speech of the user comprises receiving the speech of the user over a Public Switched Telephone Network (PSTN).

21. A method as recited in claim 1, wherein said receiving speech of the user comprises receiving the speech of the user from a local microphone, and said playing the prompts to the user comprises playing the prompts to the user via a local speaker.

22. A method as recited in claim 1, further comprising:
receiving a Hypertext Transport Protocol (HTTP) cookie from a remote speech application; and
using the HTTP cookie to maintain state of the remote speech application.

23. A method as recited in claim 22, further comprising using the HTTP cookie to maintain state of the remote speech application within a user session.

24. A method as recited in claim 22, further comprising using the HTTP cookie to maintain state of the remote speech application between user sessions.

25. A method as recited in claim 1, further comprising receiving verification information resulting from a speaker identity verification process executing in a remote site.

26. A method as recited in claim 25, wherein the remote site executing the speaker identity verification process is a site of a voice browser.

27. A method as recited in claim 25, further comprising providing the verification information to a remote voice content site over the wide area network in response to a user attempting to access said remote voice content site.

28. A method of providing a user with access to voice content on a network, the method comprising:
receiving a first voice hyperlink control message transmitted from a voice browser in a first r emote voice content site;
activating a voice hyperlink in response to the voice hyperlink control message to provide a user with voice access to a speech application in a second remote voice content site over a wide area network;
receiving speech of the user;
endpointing the speech of the user locally for automatic speech recognition, including concurrently applying, to the speech of the user, a first set of endpointing parameters for the voice browser and a second set of endpointing parameters for said speech application;
transmitting endpointed speech of the user to the second remote voice content site via the wide area network for speech recognition;
receiving remotely generated prompts transmitted over the wide area network; and
playing the prompts to the user.

29. A method comprising:
receiving remotely transmitted endpointed speech of a user over a network, the endpointed speech having been endpointed for automatic speech recognition by a remote device and transmitted onto the network by the remote device;
recognizing the speech locally;
generating a prompt in response to the speech;
transmitting the prompt to the remote device over the network; and
providing a voice hyperlink control message to the remote device over the network to allow the remote device to access a remote voice content site.

30. A method as recited in claim 29, wherein the network is a local area network.

31. A method as recited in claim 29, wherein the network is a wide area network.

32. A method as recited in claim 29, wherein the remote device has a voice connection with the user.

33. A method as recited in claim 29, further comprising transmitting a voice hyperlink control message to the remote device in response to speech from the user.

34. A method as recited in claim 29, further comprising transmitting a control message to the remote device indicating whether the speech of the user represents a hotword.

35. A method as recited in claim 29, further comprising transmitting a set of endpointing parameters to the remote device over the network.

36. A method as recited in claim 29, wherein the endpointed speech is received in packetized form, and wherein said transmitting the prompt comprises transmitting the prompt in packetized form.

37. A method as recited in claim 29, further comprising performing speaker verification on behalf of a plurality of remote voice content sites, including transmitting speaker identification information to said remote device over the network.

38. A method as recited in claim 29, further comprising locally storing an HTTP cookie to maintain state of a speech application between user sessions.

39. A method comprising:
receiving endpointed speech of a user transmitted remotely over a wide area network, the endpointed speech having been endpointed for automatic speech recognition by a remote device and transmitted onto the wide area network by the remote device;
recognizing the speech locally;
generating a prompt in response to the speech; and
transmitting the prompt to the remote device over the wide area network.

40. A method as recited in claim 39, wherein the remote device has a voice connection with the user.

41. A method as recited in claim 39, further comprising transmitting a voice hyperlink control message to the remote device over the wide area network to allow the remote device to access a remote voice content site on the network.

42. A method as recited in claim 39, further comprising transmitting a set of endpointing parameters to the remote device over the network.

43. A method as recited in claim 42, wherein said transmitting the set of endpointing parameters comprises transmitting the set of endpointing parameters in a response to the endpointed speech, such that the remote device can implement the set of endpointing parameters dynamically during a session with a user.

44. A method as recited in claim 39, wherein the endpointed speech is received in packetized form, and wherein said transmitting the prompt comprises transmitting the prompt in packetized form.

45. A device comprising:
a voice interface to allow the device to receive speech from a user;
an endpointer to perform endpointing of the speech of the user for automatic speech recognition;
a network interface to connect the device to a wide area network; and
a processor to control the device to cause the device to provide the user with voice access to a remote content site maintaining a speech application over the wide area network, wherein the processor is configured
to transmit the endpointed speech of the user to a remote speech recognizer over the wide area network,
to receive prompts via the wide area network, and
to play the prompts to the user via the voice interface.

46. A gateway for use in a speech-enabled processing system, the gateway comprising:
voice interface means for receiving speech from a user;
endpointer means for endpointing the speech of the user for automatic speech recognition;
network interface means for connecting the gateway to a wide area network; and
control means for controlling the gateway to provide the user with voice access to a remote content site maintaining a speech-enabled application via the wide area network, the control means including
means for transmitting results of said endpointing to the remote speech application over the wide area network,
means for receiving prompts transmitted over the wide area network, and
means for playing the prompts to the user using the voice interface means.

47. A voice content site on a network, the voice content site comprising:
means for receiving remotely transmitted endpointed speech of a user over a network, the endpointed speech having been endpointed for automatic speech recognition and transmitted onto the network by a remote gateway having a voice connection with the user;
means for recognizing the speech;
means for generating a prompt in response to the speech; and
means for transmitting the prompt to the gateway over the network.

48. An apparatus for operating a voice content site on a network, the method comprising:
means for receiving endpointed speech of a user transmitted remotely over a wide area network, the endpointed speech having been endpointed for automatic speech recognition and transmitted onto the wide area network by a remote gateway having a voice connection with the user;
means for recognizing the speech locally;
means for generating a prompt in response to the speech; and
means for transmitting the prompt to the gateway over the wide area network.

49. A speech-enabled distributed processing system comprising:
a gateway configured to provide a user with sequential voice access to selected ones of a plurality of remote voice content sites on a first network, each of the remote voice content sites operating a speech application, the gateway coupled to receive speech from the user via a voice interface, the gateway further configured to perform endpointing of the speech for automatic speech recognition, to transmit the endpointed speech onto the first network, and to receive prompts transmitted over the first network and to play the prompts to the user; and
a first voice content site remotely coupled to the gateway on the first network, the first voice content site configured to receive endpointed speech of the user transmitted by the gateway over the first network, to perform speech recognition on the endpointed speech, to generate prompts and to transmit the generated prompts to the gateway over the first network, and to provide control messages to the gateway to configure the gateway to provide the user with access to another remote voice content site on the first network in response to an utterance of the user.

50. A speech-enabled processing system comprising:
a gateway coupled to concurrently receive a plurality of telephone communications, each from a different user, via a telephony enabled network, the gateway configured to provide concurrently each of the users with sequential voice access to selected ones of a plurality of remote voice content sites, each of the remote voice content sites operating a speech application, at least some of the remote voice content sites coupled to the gateway via a wide area network, the gateway further configured to perform endpointing of speech of the user for automatic speech recognition and to output results of said endpointing in requests onto the wide area network, the results of said endpointing selectively directed by the gateway to appropriate ones of the remote content sites, the gateway further configured to receive prompts in responses via the wide area network and to play the prompts to the user;
a first voice content site of the plurality of voice content sites, coupled to the gateway remotely via the wide area network, the voice content site configured to receive the requests via the wide area network and to perform speech recognition on the endpointed speech contained therein, the voice content site further configured to generate the prompts and to output the packetized prompts in the responses onto the wide area network; and
a second voice content site of the plurality of voice content sites, coupled to the gateway, the second voice content site including a voice browser configured to control access by the gateway to the plurality of remote voice content sites, the voice browser configured to provide the gateway with voice hyperlink control messages to configure the gateway to selectively direct the results of said endpointing in response to speech from a user, to activate a voice hyperlink to a selected voice content site.

51. An apparatus comprising:
a telephony device to provide telephonic communication between a local user and a remote user on a wide area network, the telephony device including an audio input device to receive speech from the local user and an audio output device to output speech of the remote user to the local user; and a gateway to provide the local user with voice access to any of a plurality of remote voice content sites via the wide area network, the gateway including an endpointer to endpoint speech of the local user for automatic speech recognition, the gateway configured to transmit results of endpointing the speech of the local user to a remote speech application over the wide area network, to receive prompts transmitted over the wide area network by the speech application, and to play the prompts to the local user using the audio output device.

52. An apparatus as recited in claim 51, wherein said telephony device uses Internet Protocol (IP) telephony to provide the telephonic communication.

53. An apparatus as recited in claim 51, wherein the apparatus is part of a personal computer (PC).

54. An apparatus as recited in claim 51, wherein the telephony device uses Internet Protocol (IP) telephony to provide the telephonic communication and the apparatus is part of a personal computer (PC).

* * * * *